US012387736B2

(12) United States Patent
Denis et al.

(10) Patent No.: US 12,387,736 B2
(45) Date of Patent: Aug. 12, 2025

(54) AUDIO COMPRESSION WITH GENERATIVE ADVERSARIAL NETWORKS

(71) Applicant: Seer Global, Inc., New York, NY (US)

(72) Inventors: Andrew Denis, Prescott, AZ (US); Harry Howard Wills, Jr., Princeville, HI (US)

(73) Assignee: ZON GLOBAL IP INC., New York, NY (US)

( * ) Notice: Subject to any disclaimer, the term of this patent is extended or adjusted under 35 U.S.C. 154(b) by 0 days.

(21) Appl. No.: 18/934,983

(22) Filed: Nov. 1, 2024

(65) Prior Publication Data

US 2025/0201257 A1 Jun. 19, 2025

Related U.S. Application Data

(63) Continuation-in-part of application No. 18/787,514, filed on Jul. 29, 2024, now Pat. No. 12,236,964.

(Continued)

(51) Int. Cl.
*G10L 21/0232* (2013.01)
*G06N 3/0475* (2023.01)

(Continued)

(52) U.S. Cl.
CPC ........ *G10L 19/173* (2013.01); *G10L 21/0208* (2013.01); *G10L 25/30* (2013.01)

(58) Field of Classification Search
CPC ..... G10L 19/007; G10L 19/02; G10L 19/173; G10L 21/02; G10L 25/30; G06N 3/0475; G06N 3/094; G06N 21/0232

(Continued)

(56) References Cited

U.S. PATENT DOCUMENTS 9,842,605 B2 12/2017 Lu et al.
9,875,747 B1 1/2018 Kim et al.

(Continued)

FOREIGN PATENT DOCUMENTS

CN 109785847 A 5/2019
CN 117521729 A 2/2024

(Continued)

OTHER PUBLICATIONS

Alexandre Defossez et al. "High Fidelity Neural Audio Compression" META, Oct. 24, 2022, (19 Pages).

(Continued)

*Primary Examiner* — Martin Lerner
(74) *Attorney, Agent, or Firm* — NEO IP

(57) ABSTRACT

An AI-based audio compression method for use with audio formats, alone or in combination with other audio compression and enhancement approaches. A combination of audio pre-processing, sound to visual transcoding of audio, and a sequence of AI-enabled methods enabling maximal entropy order extraction applied within the sound and dimensionally extended visual domain projection of the audio significantly increases the degree of compression of audio files, thereby reducing storage, transmission and processing overhead associated with audio. A unique AI-driven domain conversion is leveraged together with domain-specific AI processing stages to reduce file size, while supporting optional use of standard and proprietary audio encoding, decoding, compression, and other methods. Support for native mode photonic computer processing of the higher-dimensional order representation of media enables further optimization via photonic computing methods that would not be possible if the audio was not extended into higher order visual domain space.

7 Claims, 28 Drawing Sheets

Related U.S. Application Data

(60) Provisional application No. 63/558,481, filed on Feb. 27, 2024, provisional application No. 63/541,891, filed on Oct. 1, 2023, provisional application No. 63/529,724, filed on Jul. 29, 2023.

(51) Int. Cl.
*G10L 19/16* (2013.01)
*G10L 21/0208* (2013.01)
*G10L 25/30* (2013.01)

(58) Field of Classification Search
USPC ..... 704/205, 206, 500, 501, 226; 706/12, 22
See application file for complete search history.

(56) References Cited

U.S. PATENT DOCUMENTS

| | | | | |
|---|---|---|---|---|
| 10,176,809 | B1 | 1/2019 | Piérard | |
| 10,211,856 | B1 | 2/2019 | Petre et al. | |
| 10,373,300 | B1 | 8/2019 | Besenbruch et al. | |
| 10,460,747 | B2 | 10/2019 | Roblek et al. | |
| 10,489,936 | B1 | 11/2019 | Zafar et al. | |
| 10,714,118 | B2 | 7/2020 | Sadri | |
| 10,963,540 | B2 | 3/2021 | Raissi et al. | |
| 10,991,379 | B2 | 4/2021 | Hijazi et al. | |
| 11,049,481 | B1 * | 6/2021 | Li | G06N 3/047 |
| 11,082,789 | B1 | 8/2021 | Mimilakis et al. | |
| 11,153,566 | B1 | 10/2021 | Tao et al. | |
| 11,462,209 | B2 | 10/2022 | Arik et al. | |
| 11,514,925 | B2 | 11/2022 | Jin et al. | |
| 11,562,764 | B2 | 1/2023 | Schmidt et al. | |
| 11,615,057 | B2 | 3/2023 | More | |
| 11,625,613 | B2 | 4/2023 | Karras et al. | |
| 11,645,356 | B2 | 5/2023 | O'Donncha et al. | |
| 11,657,828 | B2 | 5/2023 | Quillen | |
| 11,728,826 | B2 | 8/2023 | Pope | |
| 11,854,554 | B2 | 12/2023 | Chang et al. | |
| 11,876,969 | B2 | 1/2024 | Said | |
| 11,881,227 | B2 | 1/2024 | Jang et al. | |
| 11,887,602 | B1 | 1/2024 | Wilson et al. | |
| 11,924,624 | B2 | 3/2024 | Sharma et al. | |
| 11,978,466 | B2 * | 5/2024 | Zhang | G10L 25/30 |
| 11,985,179 | B1 | 5/2024 | Tacer et al. | |
| 12,001,950 | B2 | 6/2024 | Zhang et al. | |
| 12,020,679 | B1 | 6/2024 | Xu et al. | |
| 12,141,347 | B1 | 11/2024 | Souden et al. | |
| 12,168,176 | B2 * | 12/2024 | Rios | G10L 25/30 |
| 12,170,096 | B2 * | 12/2024 | Kumar | G10L 25/30 |
| 12,236,964 | B1 * | 2/2025 | Denis | G10L 25/30 |
| 2001/0050953 | A1 | 12/2001 | Kempf | |
| 2003/0115054 | A1 | 6/2003 | Iso-Sipila | |
| 2011/0188755 | A1 | 8/2011 | Bratkovski et al. | |
| 2017/0024652 | A1 | 1/2017 | Kipersztok et al. | |
| 2017/0099200 | A1 | 4/2017 | Ellenbogen et al. | |
| 2020/0193276 | A1 | 6/2020 | Wozniak et al. | |
| 2020/0293889 | A1 | 9/2020 | Terasaki | |
| 2021/0065731 | A1 | 3/2021 | Matsukawa et al. | |
| 2021/0125629 | A1 | 4/2021 | Bryan | |
| 2021/0142816 | A1 | 5/2021 | Yamada | |
| 2021/0150769 | A1 | 5/2021 | Babaheidarian | |
| 2022/0013132 | A1 | 1/2022 | Engel et al. | |
| 2022/0092413 | A1 | 3/2022 | Wang et al. | |
| 2022/0101872 | A1 | 3/2022 | Kumar et al. | |
| 2022/0174328 | A1 | 6/2022 | Toderici et al. | |
| 2022/0180165 | A1 | 6/2022 | Ishii et al. | |
| 2022/0182455 | A1 | 6/2022 | Zimmerman et al. | |
| 2022/0198278 | A1 | 6/2022 | O'Donncha et al. | |
| 2022/0208204 | A1 * | 6/2022 | Sivaraman Narayanaswamy | G10L 25/30 |
| 2022/0215848 | A1 | 7/2022 | Xiao et al. | |
| 2022/0238091 | A1 | 7/2022 | Jasleen et al. | |
| 2022/0253671 | A1 | 8/2022 | Chamberlain et al. | |
| 2022/0337442 | A1 | 10/2022 | Bahl | |
| 2023/0019463 | A1 | 1/2023 | Duke et al. | |
| 2023/0108579 | A1 | 4/2023 | Cao et al. | |
| 2023/0156207 | A1 | 5/2023 | Yang et al. | |
| 2023/0162725 | A1 * | 5/2023 | Jin | G10L 15/16 704/232 |
| 2023/0199204 | A1 | 6/2023 | Moussaoui et al. | |
| 2023/0230610 | A1 * | 7/2023 | Seetharaman | G10L 21/0232 704/202 |
| 2023/0244678 | A1 | 8/2023 | Hill | |
| 2023/0245668 | A1 | 8/2023 | Xiao et al. | |
| 2023/0259714 | A1 | 8/2023 | Lange | |
| 2023/0267950 | A1 | 8/2023 | Jang et al. | |
| 2023/0298593 | A1 | 9/2023 | Ramos et al. | |
| 2023/0325612 | A1 | 10/2023 | Ghatage et al. | |
| 2023/0396810 | A1 | 12/2023 | Ge et al. | |
| 2024/0029755 | A1 | 1/2024 | Querze, III et al. | |
| 2024/0055006 | A1 | 2/2024 | Biswas | |
| 2024/0078264 | A1 | 3/2024 | Solis et al. | |
| 2024/0080044 | A1 | 3/2024 | Kim et al. | |
| 2024/0152669 | A1 | 5/2024 | Pestourie et al. | |
| 2024/0160856 | A1 | 5/2024 | Sprott et al. | |
| 2024/0185829 | A1 | 6/2024 | Wang et al. | |
| 2024/0203443 | A1 | 6/2024 | JJoshi et al. | |
| 2024/0221756 | A1 | 7/2024 | Lopatka et al. | |
| 2024/0257819 | A1 * | 8/2024 | Boros | G10L 25/30 |
| 2024/0282298 | A1 | 8/2024 | Koneru et al. | |
| 2024/0289618 | A1 | 8/2024 | Chen et al. | |
| 2024/0311405 | A1 | 9/2024 | Kim et al. | |
| 2024/0371388 | A1 | 11/2024 | Huang et al. | |
| 2024/0394523 | A1 | 11/2024 | Aimone et al. | |
| 2025/0005276 | A1 | 1/2025 | Bhat et al. | |
| 2025/0021842 | A1 | 1/2025 | Bernstein et al. | |
| 2025/0068764 | A1 | 2/2025 | Joshi et al. | |
| 2025/0086170 | A1 | 3/2025 | Rumade et al. | |

FOREIGN PATENT DOCUMENTS

| | | | | |
|---|---|---|---|---|
| EP | 3364342 | A1 | 8/2018 | |
| EP | 3816998 | A1 | 5/2021 | |
| EP | 4016363 | A1 | 6/2022 | |
| EP | 4303774 | A1 | 1/2024 | |
| WO | 02088907 | A2 | 11/2002 | |
| WO | 2021178651 | A1 | 9/2021 | |
| WO | 2022211658 | A1 | 10/2022 | |
| WO | 2023278889 | A1 | 1/2023 | |
| WO | 2023086686 | A1 | 5/2023 | |
| WO | 2023139395 | A1 | 7/2023 | |
| WO | WO-2023237640 | A1 * | 12/2023 | G10L 21/02 |
| WO | 2024080044 | A1 | 4/2024 | |

OTHER PUBLICATIONS

Huimin Guo, Haifang Jian, Yequan Wang, Hongchang Wang, Xiaofan Zhao, Wenqi Zhu, Qinghua Cheng, MAMGAN: Multiscale attention metric GAN for monaural speech enhancement in the time domain, Applied Acoustics, vol. 209, 2023, 109385, ISSN 0003-682X, https://doi.org/10.1016/j.apacoust.2023.109385.

* cited by examiner

| | | |
|---|---|---|
| **WAV (Waveform Audio File Format)**<br>• Uncompressed audio format<br>• High-quality sound<br>• Large file size | **ALAC (Apple Lossless Audio Codec)**<br>• Similar to FLAC<br>• Developed by Apple<br>• Lossless quality | **DSD (Direct Stream Digital)**<br>• Used for Super Audio CDs (SACD)<br>• High resolution, from 1,024X to 64X<br>• PDM different in bit structure and depth from traditional PCM formats |
| **MP3 (MPEG-1 Audio Layer 3)**<br>• Compressed audio format<br>• Popular for music files<br>• Balance of quality and file size | **OGG (Ogg Vorbis)**<br>• Open-source compressed format<br>• Often used for streaming<br>• Good quality-to-size ratio | **APE (Monkey's Audio)**<br>• Lossless compression<br>• Similar to FLAC and ALAC |
| **AAC (Advanced Audio Coding)**<br>• Higher quality than MP3<br>• Common in Apple devices | **WMA (Windows Media Audio)**<br>• Developed by Microsoft<br>• Compressed format<br>• Various versions and quality levels | **Opus**<br>• Versatile audio codec<br>• Designed for high-quality streaming |
| **FLAC (Free Lossless Audio Codec)**<br>• Lossless compression<br>• High-quality audio without loss<br>• Larger file size than MP3 or AAC | **AIFF (Audio Interchange File Format)**<br>• Developed by Apple<br>• Uncompressed format<br>• Similar to WAV | |

FIG. 3

AUDIO COMPRESSION WITH GENERATIVE ADVERSARIAL NETWORKS

CROSS REFERENCES TO RELATED APPLICATIONS

This application is related to and claims priority from the following U.S. patents and patent applications. This application is a continuation-in-part of U.S. patent application Ser. No. 18/787,514, filed Jul. 29, 2024, which claims priority to and the benefit of U.S. Provisional Patent Application No. 63/529,724, filed Jul. 29, 2023, and U.S. Provisional Patent Application No. 63/541,891, filed Oct. 1, 2023, each of which is incorporated herein by reference in its entirety.

BACKGROUND OF THE INVENTION

1. Field of the Invention

The present invention relates to file compression, and more particularly to AI transformer-based file compression.

2. Description of the Prior Art

It is generally known in the prior art to provide AI-based compression for various file types.

Prior Art Patent Documents Include the Following:

U.S. Pat. No. 11,625,613 for Generative adversarial neural network assisted compression and broadcast by inventors Karras et al., filed Jan. 7, 2021 and issued Apr. 11, 2023, discloses a latent code defined in an input space processed by the mapping neural network to produce an intermediate latent code defined in an intermediate latent space. The intermediate latent code may be used as appearance vector that is processed by the synthesis neural network to generate an image. The appearance vector is a compressed encoding of data, such as video frames including a person's face, audio, and other data. Captured images may be converted into appearance vectors at a local device and transmitted to a remote device using much less bandwidth compared with transmitting the captured images. A synthesis neural network at the remote device reconstructs the images for display.

U.S. Pat. No. 10,714,118 for Audio compression using an artificial neural network by inventor Sadri, filed Dec. 30, 2016 and issued Jul. 14, 2020, discloses a method including accessing a voice signal from a first user; compressing the voice signal using a compression portion of an artificial neural network trained to compress the first user's voice; and sending the compressed voice signal to a second client computing device.

U.S. Pat. No. 9,875,747 for Device specific multi-channel data compression by inventors Kim et al., filed Jul. 15, 2016 and issued Jan. 23, 2018, discloses a sensor device including a computing device in communication with multiple microphones. A neural network executing on the computing device may receive audio signals from each microphone. One microphone signal may serve as a reference signal. The neural network may extract differences in signal characteristics of the other microphone signals as compared to the reference signal. The neural network may combine these signal differences into a lossy compressed signal. The sensor device may transmit the lossy compressed signal and the lossless reference signal to a remote neural network executing in a cloud computing environment for decompression and sound recognition analysis.

U.S. Pat. No. 11,881,227 for Audio signal compression method and apparatus using deep neural network-based multilayer structure and training method thereof by inventors Jang et al., filed Jan. 13, 2023 and issued Jan. 23, 2024, discloses a method, executed by a processor for compressing an audio signal in multiple layers, comprising: (a) restoring, in a highest layer, an input audio signal as a first signal; (b) restoring, in at least one intermediate layer, a signal obtained by subtracting an upsampled signal, which is obtained by upsampling the audio signal restored in the highest layer or an immediately previous intermediate layer, from the input audio signal as a second signal; and (c) restoring, in a lowest layer, a signal obtained by subtracting an upsampled signal, which is obtained by upsampling the audio signal restored in an intermediate layer immediately before the lowest layer, from the input audio signal as a third signal, wherein the first signal, the second signal, and the third signal are combined to output a final restoration audio signal.

U.S. Pat. No. 11,924,624 for Multi-channel speech compression system and method by inventors Sharma et al., filed Feb. 11, 2022 and issued Mar. 5, 2024, discloses a method, computer program product, and computing system for selecting a reference audio acquisition device from a plurality of audio acquisition devices of an audio recording system. Audio encounter information of the reference microphone may be encoded, thus defining encoded reference audio encounter information. A plurality of acoustic relative transfer functions between the reference microphone and the plurality of audio acquisition devices of the audio recording system may be generated. The encoded reference audio encounter information and a representation of the plurality of acoustic relative transfer functions may be transmitted.

US Patent Pub. No. 2023/0396810 for Hierarchical audio/video or picture compression method and apparatus by inventors Ge et al., filed Aug. 22, 2023 and published Dec. 7, 2023, discloses providing an audio/video or picture compression method and apparatus, which relates to the field of artificial intelligence (AI)-based audio/video or picture compression technologies, and to the field of neural network-based audio/video or picture compression technologies. The method includes: transforming a raw audio/video or picture to feature space through a multilayer convolution operation, extracting features of different layers in the feature space, outputting rounded feature signals of the different layers, predicting probability distribution of shallow feature signals by using deep feature signals or entropy estimation results, and performing entropy encoding on the rounded feature signals. In this application, signal correlation between different layers is utilized. In this way, audio/video or picture compression performance can be improved.

US Patent Pub. No. 2024/0289618 for Deep neural network model compression by inventors Chen et al., filed Feb. 28, 2023 and published Aug. 29, 2024, discloses a system and method of pruning a machine learning model, including: training the machine learning model using training input data; calculating alpha values for different parts of the machine learning model based on gradients used in training the machine learning model wherein the alpha values are an importance metric; accumulating the calculated alpha values across training iterations; and pruning the machine learning model based upon the accumulated alpha values.

U.S. Pat. No. 11,153,566 for Variable bit rate generative compression method based on adversarial learning by inventors Tao et al., filed May 24, 2021 and issued Oct. 19, 2021, discloses a variable bit rate generative compression method based on adversarial learning. According to the method, a variance of a feature map of an encoding-decoding fill convolutional network is quantized to train a single generative model to perform variable bit rate compression. The method includes the following implementation steps of: constructing training and testing data sets through an image acquisition device; constructing a generative compression network based on an auto-encoder structure; according to a rate-distortion error calculation unit, alternately training a generative network; according to a target compression rate, calculating a mask threshold; based on a feature map channel redundancy index, calculating a mask; and performing lossless compression and decoding on the mask and the feature map. According to the invention, only a single model is trained, but compression results with different bit rates can be generated, and on a limit compression rate below 0.1 bpp.

U.S. Pat. No. 11,615,057 for Data compression and decompression facilitated by machine learning by inventor More, filed Feb. 21, 2020 and issued Mar. 28, 2023, discloses compressing data. A first encoding, a decoding, and an error prediction index are received from one or more artificial neural networks. The first encoding corresponds to a lossy compression of the data. The decoding corresponds to a decompression of the first encoding. The error prediction index indicates one or more locations of predicted error in the decoding. Based on the data and the error prediction index, a first set of bits is generated to include one or more bit values of the data at the one or more locations of predicted error. Based on the error prediction index and the decoding, a second set of bits is generated to indicate one or more locations of unpredicted error in the decoding. The first encoding, the first set of bits, and the second set of bits are stored as a losslessly compressed version of the data.

Chinese Patent No. 109785847 for Audio compression algorithm based on dynamic residual error network, filed Jan. 25, 2019 and issued Apr. 30, 2021, discloses audio signal compression processing, and particularly relates to a dynamic coding algorithm based on a residual error network. The algorithm is designed based on a residual error network method in deep learning, and mainly comprises three parts, namely a self-encoder preprocessing module, dynamic encoding of a multi-section residual error network and model compression of the dynamic residual error network. The algorithm firstly segments audio, removes features of audio signals according to psychoacoustics, and then uses a self-encoder for pre-training. The attention behavior of dynamic coding in multiple sections of residual errors is optimized by utilizing a bidirectional cyclic neural network, and dynamic bit rate distribution is realized, so that the compression effect of a dynamic residual error network is better. And finally, performing model compression training on the network by using a distillation learning mode, reducing the training difficulty and finally obtaining an encoding mode with good compression performance.

The article "High Fidelity Neural Audio Compression" by authors Alexandre Defossez et al., published Oct. 24, 2022, discloses a state-of-the-art real-time, high-fidelity, audio codec leveraging neural networks. It consists in a streaming encoder-decoder architecture with quantized latent space trained in an end-to-end fashion. The paper simplifies and speeds-up the training by using a single multiscale spectrogram adversary that efficiently reduces artifacts and produce high-quality samples. The paper introduces a novel loss balancer mechanism to stabilize training: the weight of a loss now defines the fraction of the overall gradient it should represent, thus decoupling the choice of this hyper-parameter from the typical scale of the loss. Finally, the paper studies how lightweight Transformer models can be used to further compress the obtained representation by up to 40%, while staying faster than real time. The paper provides a detailed description of the key design choices of the proposed model including: training objective, architectural changes and a study of various perceptual loss functions. The paper presents an extensive subjective evaluation (MUSHRA tests) together with an ablation study for a range of bandwidths and audio domains, including speech, noisy-reverberant speech, and music. The approach is superior to the baselines methods across all evaluated settings, considering both 24 kHz monophonic and 48 kHz stereophonic audio.

U.S. Pat. No. 12,001,950 for Generative adversarial network based audio restoration by inventors Zhang et al., filed Mar. 12, 2019 and issued Jun. 4, 2024, discloses mechanisms for implementing a generative adversarial network (GAN) based restoration system. A first neural network of a generator of the GAN based restoration system is trained to generate an artificial audio spectrogram having a target damage characteristic based on an input audio spectrogram and a target damage vector. An original audio recording spectrogram is input to the trained generator, where the original audio recording spectrogram corresponds to an original audio recording and an input target damage vector. The trained generator processes the original audio recording spectrogram to generate an artificial audio recording spectrogram having a level of damage corresponding to the input target damage vector. A spectrogram inversion module converts the artificial audio recording spectrogram to an artificial audio recording waveform output.

U.S. Pat. No. 11,514,925 for Using a predictive model to automatically enhance audio having various audio quality issues by inventors Jin et al., filed Apr. 30, 2020 and issued Nov. 29, 2022, discloses operations of a method including receiving a request to enhance a new source audio. Responsive to the request, the new source audio is input into a prediction model that was previously trained. Training the prediction model includes providing a generative adversarial network including the prediction model and a discriminator. Training data is obtained including tuples of source audios and target audios, each tuple including a source audio and a corresponding target audio. During training, the prediction model generates predicted audios based on the source audios. Training further includes applying a loss function to the predicted audios and the target audios, where the loss function incorporates a combination of a spectrogram loss and an adversarial loss. The prediction model is updated to optimize that loss function. After training, based on the new source audio, the prediction model generates a new predicted audio as an enhanced version of the new source audio.

U.S. Pat. No. 11,657,828 for Method and system for speech enhancement by inventor Quillen, filed Jan. 31, 2020 and issued May 23, 2023, discloses improving speech data quality through training a neural network for de-noising audio enhancement. One such embodiment creates simulated noisy speech data from high quality speech data. In turn, training, e.g., deep normalizing flow training, is performed on a neural network using the high quality speech data and the simulated noisy speech data to train the neural network to create de-noised speech data given noisy speech data. Performing the training includes minimizing errors in the neural network according to at least one of (i) a decoding error of an Automatic Speech Recognition (ASR) system processing current de-noised speech data results generated by the neural network during the training and (ii) spectral distance between the high quality speech data and the current de-noised speech data results generated by the neural network during the training.

US Patent Pub. No. 2024/0055006 for Method and apparatus for processing of audio data using a pre-configured generator by inventor Biswas, filed Dec. 15, 2021 and published Feb. 15, 2024, discloses a method for setting up a decoder for generating processed audio data from an audio bitstream, the decoder comprising a Generator of a Generative Adversarial Network, GAN, for processing of the audio data, wherein the method includes the steps of (a) pre-configuring the Generator for processing of audio data with a set of parameters for the Generator, the parameters being determined by training, at training time, the Generator using the full concatenated distribution; and (b) pre-configuring the decoder to determine, at decoding time, a truncation mode for modifying the concatenated distribution and to apply the determined truncation mode to the concatenated distribution. Described are further a method of generating processed audio data from an audio bitstream using a Generator of a Generative Adversarial Network, GAN, for processing of the audio data and a respective apparatus. Moreover, described are also respective systems and computer program products.

US Patent Pub. No. 2024/0203443 for Efficient frequency-based audio resampling for using neural networks by inventors Mandar et al., filed Dec. 19, 2022 and published Jun. 20, 2024, discloses systems and methods relating to the enhancement of audio, such as through machine learning-based audio super-resolution processing. An efficient resampling approach can be used for audio data received at a lower frequency than is needed for an audio enhancement neural network. This audio data can be converted into the frequency domain, and once in the frequency domain (e.g., represented using a spectrogram) this lower frequency data can be resampled to provide a frequency-based representation that is at the target input resolution for the neural network. To keep this resampling process lightweight, the upper frequency bands can be padded with zero value entries (or other such padding values). This resampled, higher frequency spectrogram can be provided as input to the neural network, which can perform an enhancement operation such as audio upsampling or super-resolution.

US Patent Pub. No. 2023/0298593 for Method and apparatus for real-time sound enhancement by inventors Ramos et al., filed May 23, 2023 and published Sep. 21, 2023 discloses a system, computer-implemented method and apparatus for training a machine learning, ML, model to perform sound enhancement for a target user in real-time, and a method and apparatus for using the trained ML model to perform sound enhancement of audio signals in real-time. Advantageously, the present techniques are suitable for implementation on resource-constrained devices that capture audio signals, such as smartphones and Internet of Things devices.

U.S. Pat. No. 10,991,379 for Data driven audio enhancement by inventors Hijazi et al., filed Jun. 22, 2018 and issued Apr. 27, 2021, discloses systems and methods for audio enhancement. For example, methods may include accessing audio data; determining a window of audio samples based on the audio data; inputting the window of audio samples to a classifier to obtain a classification, in which the classifier includes a neural network and the classification takes a value from a set of multiple classes of audio; selecting, based on the classification, an audio enhancement network from a set of multiple audio enhancement networks; applying the selected audio enhancement network to the window of audio samples to obtain an enhanced audio segment, in which the selected audio enhancement network includes a neural network that has been trained using audio signals of a type associated with the classification; and storing, playing, or transmitting an enhanced audio signal based on the enhanced audio segment.

U.S. Pat. No. 10,460,747 for Frequency based audio analysis using neural networks by inventors Roblek et al., filed May 10, 2016 and issued Oct. 29, 2019, discloses methods, systems, and apparatus, including computer programs encoded on computer storage media, for frequency based audio analysis using neural networks. One of the methods includes training a neural network that includes a plurality of neural network layers on training data, wherein the neural network is configured to receive frequency domain features of an audio sample and to process the frequency domain features to generate a neural network output for the audio sample, wherein the neural network comprises (i) a convolutional layer that is configured to map frequency domain features to logarithmic scaled frequency domain features, wherein the convolutional layer comprises one or more convolutional layer filters, and (ii) one or more other neural network layers having respective layer parameters that are configured to process the logarithmic scaled frequency domain features to generate the neural network output.

U.S. Pat. No. 11,462,209 for Spectrogram to waveform synthesis using convolutional networks by inventors Arik et al., filed Mar. 27, 2019 and issued Oct. 4, 2022, discloses an efficient neural network architecture, based on transposed convolutions to achieve a high compute intensity and fast inference. In one or more embodiments, for training of the convolutional vocoder architecture, losses are used that are related to perceptual audio quality, as well as a GAN framework to guide with a critic that discerns unrealistic waveforms. While yielding a high-quality audio, embodiments of the model can achieve more than 500 times faster than real-time audio synthesis. Multi-head convolutional neural network (MCNN) embodiments for waveform synthesis from spectrograms are also disclosed. MCNN embodiments enable significantly better utilization of modern multi-core processors than commonly-used iterative algorithms like Griffin-Lim and yield very fast (more than 300× real-time) waveform synthesis. Embodiments herein yield high-quality speech synthesis, without any iterative algorithms or autoregression in computations.

U.S. Pat. No. 11,854,554 for Method and apparatus for combined learning using feature enhancement based on deep neural network and modified loss function for speaker recognition robust to noisy environments by inventors Chang et al., filed Mar. 30, 2020 and issued Dec. 26, 2023, discloses a transformed loss function and feature enhancement based on a deep neural network for speaker recognition that is robust to a noisy environment. The combined learning method using the transformed loss function and the feature enhancement based on the deep neural network for speaker recognition that is robust to the noisy environment, according to an embodiment, may comprise: a preprocessing step for learning to receive, as an input, a speech signal and remove a noise or reverberation component by using at least one of a beamforming algorithm and a dereverberation algorithm using the deep neural network; a speaker embedding step for learning to classify an utterer from the speech signal, from which a noise or reverberation component has been removed, by using a speaker embedding model based on the deep neural network; and a step for, after connecting a deep neural network model included in at least one of the beamforming algorithm and the dereverberation algorithm and the speaker embedding model, for speaker embedding, based on the deep neural network, performing combined learning by using a loss function.

U.S. Pat. No. 12,020,679 for Joint audio interference reduction and frequency band compensation for videoconferencing by inventors Xu et al., filed Aug. 3, 2023 and issued Jun. 25, 2024, discloses a device receiving an audio signal recorded in a physical environment and applying a machine learning model onto the audio signal to generate an enhanced audio signal. The machine learning model is configured to simultaneously remove interference and distortion from the audio signal and is trained via a training process. The training process includes generating a training dataset by generating a clean audio signal and generating a noisy distorted audio signal based on the clean audio signal that includes both an interference and a distortion. The training further includes constructing the machine learning model as a generative adversarial network (GAN) model that includes a generator model and multiple discriminator models, and training the machine learning model using the training dataset to minimize a loss function defined based on the clean audio signal and the noisy distorted audio signal.

US Patent Pub. No. 2023/0267950 for Audio signal generation model and training method using generative adversarial network by inventors Jang et al., filed Jan. 13, 2023 and published Aug. 24, 2023, discloses a generative adversarial network-based audio signal generation model for generating a high quality audio signal comprising: a generator generating an audio signal with an external input; a harmonic-percussive separation model separating the generated audio signal into a harmonic component signal and a percussive component signal; and at least one discriminator evaluating whether each of the harmonic component signal and the percussive component signal is real or fake.

U.S. Pat. No. 11,562,764 for Apparatus, method or computer program for generating a bandwidth-enhanced audio signal using a neural network processor by inventors Schmidt et al., filed Apr. 17, 2020 and issued Jan. 24, 2023, discloses an apparatus for generating a bandwidth enhanced audio signal from an input audio signal having an input audio signal frequency range includes: a raw signal generator configured for generating a raw signal having an enhancement frequency range, wherein the enhancement frequency range is not included in the input audio signal frequency range; a neural network processor configured for generating a parametric representation for the enhancement frequency range using the input audio frequency range of the input audio signal and a trained neural network; and a raw signal processor for processing the raw signal using the parametric representation for the enhancement frequency range to obtain a processed raw signal having frequency components in the enhancement frequency range, wherein the processed raw signal or the processed raw signal and the input audio signal frequency range of the input audio signal represent the bandwidth enhanced audio signal.

US Patent Pub. No. 2023/0245668 for Neural network-based audio packet loss restoration method and apparatus, and system by inventors Xiao et al., filed Sep. 30, 2020 and published Aug. 3, 2023, discloses an audio packet loss repairing method, device and system based on a neural network. The method comprises: obtaining an audio data packet, the audio data packet comprises a plurality of audio data frames, and the plurality of audio data frames at least comprise a plurality of voice signal frames; determining a position of a lost voice signal frame in the plurality of audio data packet to obtain position information of the lost frame, the position comprising a first preset position or a second reset position; selecting, according to the position information of the lost frame, a neural network model for repairing the lost frame, the neural network model comprising a first repairing model and a second repairing model; and sending the plurality of audio data frames to the selected neural network model so as to repair the lost voice signal frame.

WIPO Patent Pub. No. 2024/080044 for Graphical user interface for generative adversarial network music synthesizer by inventors Narita et al., filed Sep. 7, 2023 and published Apr. 18, 2024, discloses an information processing system that receives input sound and pitch information; extracts a timbre feature amount from the input sound; and generates information of a musical instrument sound with a pitch based on the timbre feature amount and the pitch information.

The Article "MAMGAN: Multiscale attention metric GAN for monaural speech enhancement in the time domain" by authors Guo et al., published Jun. 30, 2023 in Applied Acoustics Vol. 209, discloses "In the speech enhancement (SE) task, the mismatch between the objective function used to train the SE model, and the evaluation metric will lead to the low quality of the generated speech. Although existing studies have attempted to use the metric discriminator to learn the alternative function of evaluation metric from data to guide generator updates, the metric discriminator's simple structure cannot better approximate the function of the evaluation metric, thus limiting the performance of SE. This paper proposes a multiscale attention metric generative adversarial network (MAMGAN) to resolve this problem. In the metric discriminator, the attention mechanism is introduced to emphasize the meaningful features of spatial direction and channel direction to avoid the feature loss caused by direct average pooling to better approximate the calculation of the evaluation metric and further improve SE's performance. In addition, driven by the effectiveness of the self-attention mechanism in capturing long-term dependence, we construct a multiscale attention module (MSAM). It fully considers the multiple representations of signals, which can better model the features of long sequences. The ablation experiment verifies the effectiveness of the attention metric discriminator and the MSAM. Quantitative analysis on the Voice Bank+DEMAND dataset shows that MAMGAN outperforms various time-domain SE methods with a 3.30 perceptual evaluation of speech quality score."

SUMMARY OF THE INVENTION

The present invention relates to file compression, and more particularly to AI transformer-based file compression.

It is an object of this invention to significantly increases the degree of compression of audio files, beyond currently known audio compression standards, thereby reducing the storage, transmission and processing overhead associated with the audio.

In one embodiment, the present invention is directed to a method for compressing audio content, including receiving an input audio file or stream in a digital or analog audio format, performing AI-based classification of the audio content to determine predicted labels, selectively upsampling the audio content using a deep learning enabled temporal Generative Adversarial Network (GAN) approach, applying AI-assisted mapping of dynamics and harmonics, increasing dimensional complexity of the audio content by mapping additional characteristics including timbre and dynamics, applying AI-based noise identification and reduction methods, applying AI-based high order compression within a visual domain, applying a transcoding transform to facilitate spectral transform from visual to audio domain, applying deep learning-based audio compression using GAN assisted attention transformer methods, applying selective transforms to generate one or more intermediate digital transform encodings, optimizing sampling rate and depth for desired purposes, and converting the optimized content into one or more desired output formats.

In another embodiment, the present invention includes a system for compressing audio content, including an input module configured to receive an audio file or stream, an AI-based classification module, a GAN-based upsampling module, an AI-assisted mapping module for dynamics and harmonics, a dimensional complexity increase module, an AI-based noise reduction module, an AI-based high order compression module, a transcoding transform module, a deep learning-based audio compression module, a selective transform module, a sampling rate and depth optimization module, and an output format conversion module.

In yet another embodiment, the present invention includes a system for compressing audio content, including an input module configured to receive an audio file or stream, an AI-based classification module operable to predict one or more of: music genre, weather elements, and human activities, a GAN-based upsampling module, an AI-assisted mapping module for dynamics and harmonics, a dimensional complexity increase module, an AI-based high order compression module, a transcoding transform module, a deep learning-based audio compression module, a selective transform module, a sampling rate and depth optimization module, and an output format conversion module.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 3 is a chart of different file formats compatible with one embodiment of the present invention.

DETAILED DESCRIPTION

Figure 1:
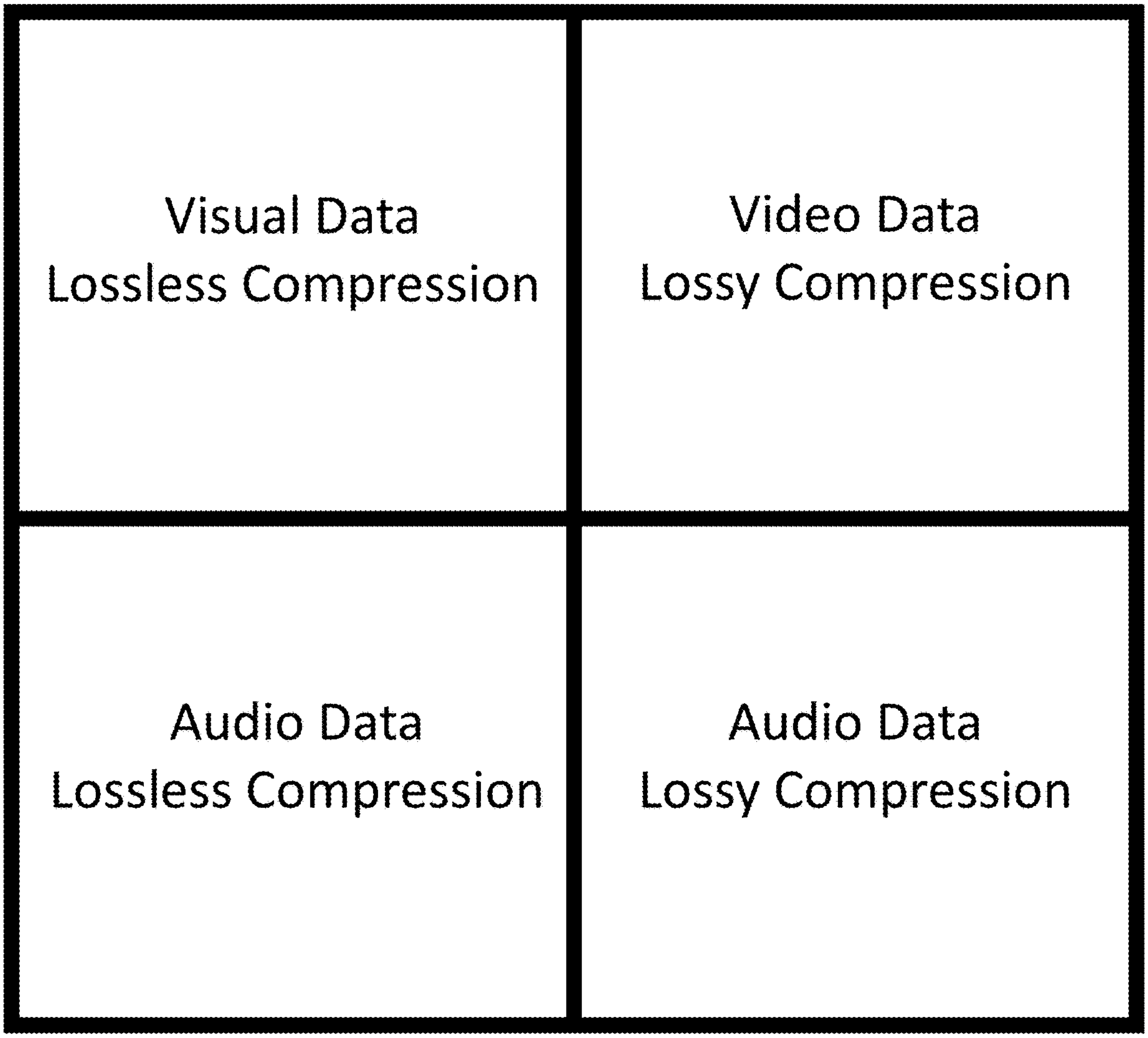
FIG. 1 is a chart of four different types of compression achievable according to one embodiment of the present invention.

The present invention is generally directed to file compression, and more particularly to AI transformer-based file compression.

In one embodiment, the present invention is directed to a method for compressing audio content, including receiving an input audio file or stream in a digital or analog audio format, performing AI-based classification of the audio content to determine predicted labels, selectively upsampling the audio content using a deep learning enabled temporal Generative Adversarial Network (GAN) approach, applying AI-assisted mapping of dynamics and harmonics, increasing dimensional complexity of the audio content by mapping additional characteristics including timbre and dynamics, applying AI-based noise identification and reduction methods, applying AI-based high order compression within a visual domain, applying a transcoding transform to facilitate spectral transform from visual to audio domain, applying deep learning-based audio compression using GAN assisted attention transformer methods, applying selective transforms to generate one or more intermediate digital transform encodings, optimizing sampling rate and depth for desired purposes, and converting the optimized content into one or more desired output formats.

In another embodiment, the present invention includes a system for compressing audio content, including an input module configured to receive an audio file or stream, an AI-based classification module, a GAN-based upsampling module, an AI-assisted mapping module for dynamics and harmonics, a dimensional complexity increase module, an AI-based noise reduction module, an AI-based high order compression module, a transcoding transform module, a deep learning-based audio compression module, a selective transform module, a sampling rate and depth optimization module, and an output format conversion module.

In yet another embodiment, the present invention includes a system for compressing audio content, including an input module configured to receive an audio file or stream, an AI-based classification module operable to predict one or more of: music genre, weather elements, and human activities, a GAN-based upsampling module, an AI-assisted mapping module for dynamics and harmonics, a dimensional complexity increase module, an AI-based high order compression module, a transcoding transform module, a deep learning-based audio compression module, a selective transform module, a sampling rate and depth optimization module, and an output format conversion module.

There are numerous components and processing methods widely used in the recording and playback chain of audio that collectively affect the perceived quality and other characteristics of the sound. Every type of digital recording is based on numerous assumptions, derived from a combination of engineering approximations, trial and error methods, technological constraints and limitations, prior beliefs and available knowledge at a given time that define the extents of the ability of audio engineers to support the recording, processing, distribution, and playback of audio.

Because the collection of knowledge together with beliefs and assumptions are taught as the basis for audio engineering and related theory, these beliefs and assumptions generally define the accuracy and extent of the capabilities of the industry. As a result, this collective base of understanding has historically limited the ability to engineer hardware and software solutions related to audio. In its most fundamental terms, the limitations of the accuracy and extent of the collective knowledge and understanding related to audio and the processes described have always constrained the ability of the prior art to define more optimal algorithms, methods, and associated processes using traditional, non-AI-based software and related engineering methods.

The advent of artificial intelligence coupled with the evolution of digital and analog technologies available to record, transform and play audio are allowing engineers to bypass limited and otherwise imperfect knowledge and poorly supported assumptions that limit audio fidelity and processing capabilities, in favor of an AI-enabled approach built upon ground truth data supporting a foundation model derived using a combination of source disparity recognition and related methods. As evidenced over the past several years across numerous medical, gaming, and other fields, the ability of key AI architectures to derive new capabilities has resulted in entirely new levels and types of capabilities beyond what was possible via traditional human and pre-AI computing methods.

The process of engineering and development using AI is very different from traditional, non-AI software development on a fundamental level, which enables the creation of previously impossible solutions. Using AI based development, the effective algorithms and related processes become the output created by the AI itself. When ground truth data is provided as part of the training process, it enables the neural network to become representative of a "foundation model." For the purposes of this application, ground truth data refers to reference data, which preferably includes, for the purposes of the present invention, audio information at or beyond the average human physical and perceptual limits of hearing, and a foundational model refers to a resulting AI-enabled audio algorithm that takes as input the ground truth data to perform a range of extension, enhancement and restoration of the audio, yielding a level of presence, tonal quality, dynamics and/or resulting realism that is beyond the input source quality, even where the input includes original master tapes.

As a result, the use of AI-based systems, and more specifically a level of processing power and capabilities that support the approach described herein, allows for the avoidance of traditional assumptions and beliefs in audio processing, and the resulting implicit and explicit limits of understanding associated with those assumptions and beliefs. Instead, a benchmarked standard is used based on the disparities inherent to any type of recorded music relative to reference standards by using the approach described herein.

Research on applying AI methods, especially machine learning and neural networks for digital compression, has begun in recent years. A range of AI-driven approaches are being explored due to their potential to surpass traditional compression methods in efficiency and effectiveness, particularly for complex data types like images, videos, and audio. The following provides an overview of the applicable areas, as well as important context and terminology underpinning the present system.

While the present invention supports a range of deep learning architecture that enable maximal entropy encoding/decoding as described herein, generative adversarial networks (GANs) have shown increasing utility in high-quality image and video compression for the training related optimization processing. GANs support compressed representations that, when decompressed, are representationally close to the original, often preserving more details than traditional methods. By themselves, GANs often have efficiency and fidelity limitations, but when applied in the context of a modern attention-transformer architecture as described in the context of a maximal entropy schema, GANs are able to selectively support efficient lossless as well as lossy compression.

Originally designed for natural language processing, transformers have shown utility in audio processing as well. When coupled with attention mechanisms, transformers are able to focus on different parts of the audio signal, which is beneficial for both representing and compressing complex audio data. This novel approach as defined herein leverages transformers for two primary purposes. First, the general-purpose capabilities of transformers provide a very flexible architecture to extract context and selectable degrees of contextual meaning from the media. Second, because transformers are now built into certain AI hardware, the inherent performance gains are highly significant compared to prior methods like convolutional neural networks (CNN) and recursive neural networks (RNN).

Although ensemble AI first became popular in machine learning applications prior to more widespread deep learning AI adoption, in the context of audio compression, the present invention employs an ensemble structure in order to facilitate the integration of the GAN architectural components with the attention-transformers that enable pattern correlation and extraction from the audio-to-video features expansion. In the overall evolution of AI models and architectures, an increasing number of complex AI systems appear to apply specialized groupings of ensemble-based model types and related integrative architectures, thereby increasingly starting to mirror segmented structures somewhat analogous to the human brain.

In the area of transformer-based architectures, the breadth and extent of utility for representing and processing complex data types like media has traditionally been limited. In contrast, attention-based transformer models, when used in the present invention, are able to be used to identify, and represent highly detailed elements of audio data, including timbre, tone, rhythm, and other specific audible details. When combined with the unique ensemble-based approach described herein, it enables notably higher efficiency compression approaches that retain significantly greater lossless and lossy audio fidelity at lower bitrates than prior AI or non-AI methods.

Research has been done exploring deep neural networks to create more efficient audio compression algorithms. The goal is to develop models able to learn the nuances of sound data and compress it without significant loss of quality, especially for music and speech. The present invention leverages this capability across the audio domain and the expanded visual domain spaces to obtain new levels, types, and extents of audio compression than have been possible in prior art systems or research.

AI methods are often used for lossy compression. Techniques like recurrent neural networks (RNNs) and long short-term memory (LSTM) networks have been applied to predict the upcoming data in a sequence, thereby allowing for more efficient encoding. The present invention employs more advanced transformer-based architectures, along with dimensional expansion, providing significant advantages in efficiency and performance over RNNs, and LSTM-based AI approaches. However, those prior approaches began to prove the utility of AI for lossy compression and in some situations lossless, which was, as recently as a few years ago, considered a stumbling block for applying deep learning to compression.

In natural language processing (NLP), AI methods are used to compress textual data. This involves understanding and encoding the semantic meaning of the text, potentially allowing for more effective compression than traditional character-based approaches. NLP, especially in the form of Large Language Models (LLMs), set the stage for transformer based deep learning approaches that are foundational to the present invention, by advancing hardware development and research into applying deep learning to new areas.

AI-based compression is particularly useful for domain-specific applications. For instance, in medical imaging or satellite imagery, where the preservation of certain features is more important than overall image fidelity. As such, AI models are able to be trained to prioritize the relevant aspects of the data, making them more narrowly optimized for the intended data type.

The methodology of the present invention is unique in that it combines an AI-driven dimensional expansion approach employing enhanced matrix math that makes it well suited for modern transformer-based AI methods, with a maximal entropy-enabled deep learning methodology that uses GAN-based optimization across the visual and audible domains.

Increasing dimensional complexity for data compression enables higher levels of effective compression for several reasons as described herein. Because of the temporal sequencing and related context thereby established, the dimension increase/redux approach is particularly relevant in contexts like image, video, and audio compression, as well as in high-dimensional data in fields like machine learning and scientific computing.

There are several categorical reasons why increasing dimensional complexity supports greater effective compression, but first it is important to provide the following context for the methods and factors supporting general digital compression:

1. Exploiting Correlations:

Higher-dimensional data representations of a given set of information often exposes otherwise hidden data correlations that are able to be exploited for compression. In this context, the present invention takes the sound prior to applying AI-based associative feature processing and expanding it into a time-correlated spectrally-defined sequence that includes, among other options, timbre and dynamics. This results in a higher number of constituent dimensions compared to a 3-dimensional amplitude vs frequency over time representation of standard audio representations, thereby exposing correlations that the AI leverages as described to compress the data more effectively.

2. More Efficient Encoding Schemes:

It is broadly understood that with higher-dimensional data, more sophisticated and efficient encoding schemes are able to be applied. These schemes identify and leverage time-correlated patterns that emerge across multiple dimensions, which are not apparent in lower-dimensional data.

3. Redundancy Reduction:

In higher dimensions, there are more opportunities to identify and eliminate redundancy. For instance, in an AI-feature expanded spatial dataset, there is an increased statistical frequency of related patterns, offering more compression opportunities than in the initial dataset.

4. Better Prediction Models:

Higher-dimensional, feature-expanded data allows for the use of more efficient prediction models. In audio and image compression, for example, algorithms employ predictive analysis based on preceding data, leading to more effective compression of amplitude and frequency over time.

5. Transform Coding:

Transform coding techniques, such as Fourier and Wavelet transforms, typically work more effectively with higher-dimensional data. These transforms compact the energy of the signal into fewer coefficients in higher dimensions, which are then able to be compressed more efficiently.

6. Contextual Information:

In higher dimensions, there's often more contextual information available that is able to be used to improve compression. For example, understanding the context of an audio signal, such as via AI-based pre-classification routines, often enables more effective processing of the higher dimensional spectrograms, resulting in greater compression and increased efficiencies.

7. AI Enhancements:

As described herein, applying AI on higher-dimensional data enables compression using models that learn complex patterns and relationships within the data. These models achieve higher compression ratios than non-AI methods, especially in high-dimensional spaces.

8. Quantization Efficiency:

By enabling quantized use of AI-based transformer architectures, as in a preferred embodiment, higher-dimensional data allows for more efficient quantization strategies for high bit depth sources, such as 32/64-bit floating point to 8-bit floating point transform-based representations and associated AI-based processing. Quantization into lower bit AI transform representations enables much higher processing efficiencies at reduced data sizes when employing modern AI transformers.

What is needed in the art is an AI-based audio compression method for use with any audio format, alone or in combination with other audio compression and enhancement approaches, whether currently known or otherwise. What is further needed is a combination of audio preprocessing, sound to visual transcoding of the audio, and a sequence of AI-enabled methods applied within the sound and dimensionally extended visual domain projection of the audio which significantly increases the degree of compression of audio files, beyond currently known audio compression standards, thereby reducing the storage, transmission and processing overhead associated with the audio.

The present system and method provide a novel AI-based audio compression method for use with any audio format, alone or in combination with other audio compression and enhancement approaches, whether currently known or otherwise. The system employs a unique combination of audio pre-processing, sound to visual transcoding of the audio, and a unique sequence of AI-enabled methods applied within the sound and dimensionally extended visual domain projection of the audio. This approach significantly increases the degree of compression of audio files, beyond currently known audio compression standards, thereby reducing the storage, transmission and processing overhead associated with the audio.

As described herein, this approach leverages a unique AI-driven domain conversion, together with the domain-specific AI processing stages described herein. Collectively, this results in a reduction in file size, while supporting the optional use of standard and proprietary audio encoding, decoding, compression, and other methods.

Finally, the system supports native mode photonic computer processing of the higher dimensional order representation of the media described herein, enabling further optimization via photonic computing methods that would not be possible if the audio was not extended into higher order visual domain space. Although the available photonic methods will continue to evolve, the currently supported approaches include but are not limited to, computation-by-propagation deep photonic methods using the extended domain information as described.

While traditional audio as described in technical terms is generally based on three dimensions consisting of amplitude vs. frequency over time, the present invention extends it into higher order, expanded dimensional space that includes additional characteristics that are inherent to the sound/musical information. As a result, the present system identifies additional associations and correlations over time that are not evident in lower dimensional space. By identifying characteristics such as timbre, dynamics and other aspects generally expressed and repeated over time, the AI implementation is trained on those extracted features to create patterns that very effectively compress when mapped back into reduced 3D space, as the inherent redundancies and correlations are flattened and effectively compressed in that space.

In aspects of the present invention, AI and supporting high-powered computing hardware provide new ways of addressing statistical redundancies, correlated factors and otherwise compressible aspects of digital data. This approach uniquely provides one or more of the following aspects:

1. The method leverages AI employed in both the audio and visual domains to effect optimum compression sequencing and methods.
2. Rather than requiring the creation of a new proprietary format, the present method leverages standard formats for both input and output.
3. The present method increases the dimensional complexity of the digital information in the audio and visually projected domains as a key component of achieving this effective compression.
4. The present method provides selective elimination of one or more types of spurious and ambient noise within and outside of the audible spectrum of 20 Hz to 20 kHz, which are generally inherently substantially incompressible and negatively impact the signal to noise ratio of the audio.
5. Unlike how GANs and related methods are commonly used to compress digital information, in the present, entropy-enabled method, it is the information extracted via the higher-order dimensional expansion across multiple audio and visual representations where the major compression gains are achieved, and because of this approach, lossless compression methods are well supported in addition to lossy compression.
6. The present invention supports the optional use of additional audio compression methods, as well as supporting other digital compression-based methods.
7. The present invention employs AI to support pre-classification of audio features and parameters by various categorizations including, but not limited to: intended use, dynamic range, timbral constituents such as source types or instrument types, harmonics and partial harmonics progression and decay over time, and environmental and related characteristics such as live-sourced, integrative or mixed-format type, and other aspects and delineations.
8. As a result of the above functional and related elements described in more detail below, the present invention applies AI and related methods across the audio domain and the visually projected domain to reduce the storage and transmission size of the file, resulting in lower processing, storage, and transmission requirements.

Current methodologies of digital compression are based on the approaches that are considered mutually exclusive of each other. For example, audio compression is either lossless or lossy, meaning that, with lossless compression, the original data is able to be perfectly restored from the compressed version. With lossy compression, while the maximum compression is often greater, the original data cannot be perfectly reconstructed from the compressed version.

The same correspondences between lossless and lossy exist in terms of compression of visual data, meaning that the original data is able to be reconstructed with lossless compression back to the original version, but with lossy compression, the original is not capable of being perfectly reconstructed from the compressed version. FIG. 1 depicts the 4 basic independent compression types selectively used and supported by the present invention.

Audio compression and visual compression employ very different processes from each other, and audio compression techniques such as MP3 have no application to visual methods such as JPEG. Finally, since these different forms of compression work on different types of data, their compression methods are not designed or meant to support each other, in that audio compression is optimized and supports audio, and image or video compression is optimized for visual information. Prior to this approach and the ability to leverage AI in the manner described herein, the paths for compression of audio and visual information were functionally isolated from each other.

In contrast, embodiments of the present invention not only merge the two domains of compression, but also leverage advantaged correlations in the domains for unique compression and related advantages. This results in compressible efficiencies beyond the benefits of either regime independently of each other, while allowing audio to benefit from native mode photonic compression and its massive potential advantages that would otherwise not be applicable to audio.

Finally, by optionally leveraging AI to optimize or eliminate the elements outside of human perceptual space, or that are otherwise not desired, embodiments of the present invention are able to apply AI-derived extraction of substantially uncompressible elements, resulting in additional compression gains when returning to the lower order dimensional output space. When combined and sequenced with intelligent audio and visual encoding, further perceptual space optimizations are enabled.

Figure 2:
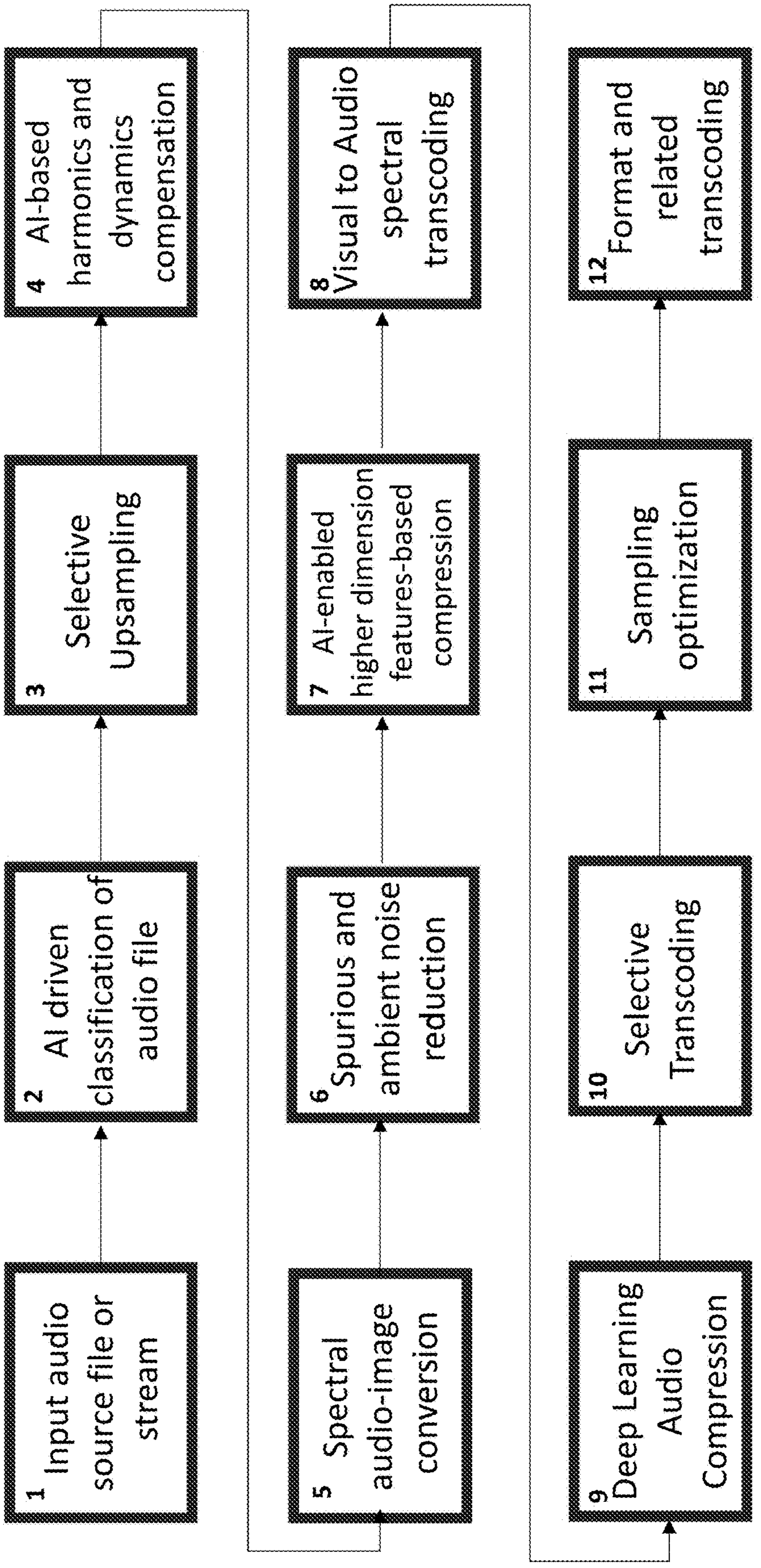
FIG. 2 is a schematic diagram of a process flow for a method of compression according to one embodiment of the present invention.

In embodiments of the present invention, a 12-stage process, as shown in FIG. 2, is provided, beginning with an input audio file or stream provided in any available digital or analog audio format to Stage 1, and finishing with "Format and related transcoding" in output Stage 12. Preferably, each stage has at most one preceding and one subsequent stage as identified, with the only options being offered as part of Stages 10, 11 and 12.

Preferably, all stages (aka steps) from the output of Stage 1 to the output of Stage 12 are in the digital domain, with only Stage 7 supporting a photonic processing option. Also, Stage 1 takes as input either digital or analog audio formats, with the input of every subsequent stage preferably assuming only digital as its input format.

As indicated in FIG. 2, the first operational step in the invention is sourcing. For context, it is important to note that while any analog or digital audio source type, format, sample rate or bit-depth is able to be provided to the system for inference, the specific features, requirements, and capabilities of the AI-related stages are as described below.

Beginning with Step 1 of FIG. 2, the system takes as input either an analog file or signal that is digitized at a given sample rate to a specific bit depth (e.g., 48 kHz at 24 bit) or a digital source file in its available bit depth and sample rate (e.g., 48 kHz at 24 bit). One of ordinary skill in the art will understand that any bit depth and sample rate is able to be accepted.

Stage 2 takes input from Stage 1, and determines classification or AI "predictions" including, but not limited to: 1. music and genre/style; 2. weather elements and subtypes like thunder, wind, rain; 3. human activities such as speech, clapping, footsteps, etc., with predicted labels used in subsequent stages as input labels, targets and/or features in subsequent stages as described below.

In Stage 3, selective upsampling is employed, which is able to employ any traditional non-AI means, AI-based or related stochastic means, or, in a preferred embodiment, a deep learning-enabled temporal Generative Adversarial Network (GAN) approach. Stage 4 takes input from Stage 3 and uses AI-assisted mapping of dynamics and harmonics that very commonly diverge from the original source, or apply transforms to map appropriately to the desired playback medium, environment or apparatus. Stage 5 takes input from Stage 4, along with AI-associated timbre, dynamics and other information as defined to increase the dimensional complexity to support higher levels of effective compression. Stage 6 takes input from Stage 5, and AI and related noise identification and reduction methods are applied to eliminate the generally undesired and substantially non-compressible noise from the audio.

Stage 7 takes input from Stage 6, and the AI-based high order compression is applied within the visual domain. Stage 8 takes input from Stage 7 and applies a transcoding transform, such as an Inverse Short-Time Fourier Transform (IS-TFT)-based visual to audio domain mapping, to facilitate the spectral transform. Stage 9 takes input from Stage 8, with deep learning-based audio compression employed using the GAN-assisted attention transformer methods. Stage 10 takes input from Stage 9, and the system applies one or more selective transforms to the desired intermediate digital transform encoding in the form of PCM or related methods. This results in one or more generated files or streams, with one for each optimization employed. Stage 11 takes input from Stage 10 and supports sampling rate and depth optimization for the desired purposes. In one embodiment, this requires several independent conversions, following the number previously generated in Stage 10. Stage 12 takes input from Stage 11 and enables each of the outputs of Stage 11 to be appropriately converted into the desired output formats, such as those defined in FIG. 3:

Embodiments of the present invention represent an advanced AI-based audio compression method. This method is designed to be universally applicable to any audio format and is able to be used in conjunction with existing compression and enhancement techniques. Critical core innovations are represented by its unique pre-processing strategy and the transformation of audio into a visual domain, followed by a series of AI-driven processes across this dimensionally extended space.

The present invention significantly outperforms current audio compression approaches, offering significant improvements in file size reduction without quality reduction when used in its lossless mode. This is achieved through several unique approaches, including the unique AI architecture's ability to detect and exploit patterns within the sound's inherent structure, such as timbre, rhythmic and dynamics, across expanded dimensional space. These patterns, once identified and mapped as described herein, are able to be efficiently compressed, and then transcoded back into a conventional three-dimensional audio space.

Additionally, the present invention introduces a novel concept where the audio, extended into a higher visual domain using extended audio features, is compatible with photonic computer processing. This compatibility enables new modes and degrees of optimization through advanced photonic computing methods, such as computation-by-propagation, which are not feasible with traditional audio formats.

The present invention enhances audio compression by leveraging AI to exploit numerous factors, including embedded characteristics in the audio, optimally exposed via higher-dimensional visual domain transforms that reveal deeper correlations and patterns, resulting in more effective compression. The architecture supports both standard and proprietary audio processing methods and formats and is designed to support current and future photonic computing techniques.

The present invention includes a modular, software-driven system and associated hardware-enabled methodology for improving and/or otherwise enhancing the sound quality and associated characteristics of audio to a level of acoustic realism, perceptual quality and sense of depth, tonality, dynamics and presence beyond the limits of prior art systems and methods, even exceeding the original master tapes.

The system of the present invention employs a combination of deep learning models and machine learning methods together with a unique process for acquiring, ingesting, indexing, and applying media-related transforms. The invention enables the use of resulting output data to train a deep learning neural network and direct a modular workflow to selectively modify the audio via a novel inference-based recovery, transformation, and restoration chain. These deep learning algorithms further allow the system to enhance, adapt, and/or recover audio quality lost during the acquisition, recording, or playback processes, due to a combination of hardware limitations, artifacts, compression, and/or other sources of loss, change, and degradation. Furthermore, the system of the present invention employs a deep neural network to analyze differences between an original audio source or recording and a degraded or changed audio signal or file and, based on knowledge obtained via the training process, distinguish categories and specific types of differences from specific reference standards. This enables a novel application of both new and existing methods to be used to recover and bring the quality and nature of the audio to a level of acoustic realism, perceptual quality, sense of depth, tonality, dynamics, and presence beyond any existing method, even including original master tapes.

The system and method for improving and enhancing audio quality of analog and digital audio as described herein provides for an improvement in the ability to listen to and enjoy music and other audio. By utilizing the deep learning algorithms of the present invention as well as the advanced recovery and transformation workflow, the system is able to effectively restore lost audio quality in both live and recorded audio and in both digital and analog audio to bring audiences closer to a non-diminished audio experience.

The present invention covers various uses of generative deep-learning algorithms that employ indexing, analysis, transforms, and segmentation to derive a ground truth-based foundation model to recover the differences between the highest possible representative quality audio recorded, both analog and digitally recorded, including comparisons with bandwidth-constrained, noise-diminished, dynamic range limited, and noise-shaped files of various formats (e.g., MP3, AAC, WAV, FLAC, etc.) and of various encoding types, delivery methods, and sample rates.

Because of the modular design of the system and the directive workflow and output of the artificial intelligence module, a wide range of hardware, software and related options are able to be introduced at different stages, as explained below, supporting a virtually unlimited range of creative, restoration, transfer, and related purposes. Unlike other methods of audio modification or restoration, the system of the present invention leverages approaches that were formerly not cost or time viable prior to the current level of processing power and scalability enabled by the use of AI-based systems. One of ordinary skill in the art will understand that the present invention is not intended to be limited to any particular analog or digital format, sampling rate, bandwidth, data rate, encoding type, bit depth, or variation of audio, and that variations of each parameter are able to be accepted according to the present invention.

The system is able to operate independently of the format of the input audio and the particular use case, meaning it supports applications including, but not limited to, delivery and/or playback using various means (e.g., headphones, mono playback, stereo playback, live event delivery, multi-channel delivery, dimensionally enhanced, and extended channel formats delivered via car stereos, as well as other types, uses and environments). While a primary use case of the present invention is for enhancing music, the system is able to be extended to optimization of other forms of audio as well, via the sequence of stages and available options as described herein. To support the extensibility to various forms of audio, the system provides for media workflow and control options, and associated interfaces (e.g., Application Programming Interfaces (APIs)).

Furthermore, the system of the present invention also includes software-enabled methodology that leverages uniquely integrated audio hardware and related digital systems to capture and encode full spectrum lossless audio, as defined by physical and perception limits of human audiology. This approach uses a uniquely integrated AI-assisted methodology as described to bypass several long-standing limits based on beliefs and assumptions related to the frequency range, transients, phase, and related limits of human hearing, in favor of results obtained via leading-edge research in sound, neurology, perception, and related fields.

The system is able to be used in isolation or in combination with other audio streaming, delivery, effects, recording, encoding or other approaches, whether identified herein or otherwise. AI is employed to support brain-computer-interface (BCI) and related brain activity monitoring and analytics, to determine physically derived perceptual human hearing limits in terms of transient, phase, frequency, harmonic content, and related factors. Current "lossless" audio formats and methods are missing over 90% of the frequency range, as well as much of the transient detail and phase accuracy necessary to be lossless, as defined by no audible signals within the limits of human hearing have been discarded, compressed, or bypassed.

Prior limits of human hearing were defined to be, at best, between 20 cycles (Hz) and 20,000 Hz using a basic pass/fail sine wave hearing test. While this is useful in a gross sense for human hearing of only sine waves, those approaches disregard the reality that virtually all sound in the real world is composed of a wide range of complex harmonic, timbral, transient, and other details. Further, virtually all hearing related tests ignore a wide range of other methods of testing and validation, including using brain pattern-based signal perception testing to ensure parity with human brain and related hearing function.

Numerous studies have begun to verify the fact that hearing extends across a much wider range of frequencies and has a much more extensive set of perceptually relevant biophysical affects. To determine the actual frequency range of human hearing, studies have been done to take such details into account, finding that human hearing extends much further when integrating those noted acoustic factors. In reality, an extended range of frequencies that are actually able to be perceived extends from 2 Hz to about 70,000 Hz. Between approximately, 2 Hz and 350 Hz, the primary part of the body able to perceive the sound is the skin or chest of a listener, while the ear is able to perceive qualities such as frequency, timbre, and intonation for sounds between approximately 350 Hz and 16,000 Hz. Between about 16,000 Hz and 70,000 Hz, the inner ear is predominant in the perception of the sound.

In addition, there are numerous other physiological and related considerations in determining how to optimally record, encode and define analog and digital sounds. For example, the idea that humans are able to hear low frequency information solely as a frequency via human ears alone is erroneous, given the size of the tympanic membrane, which is incapable of sympathetic oscillation at frequencies much below 225 Hz. Instead, transient, harmonic, and other associated detail that provides the critical sonic information enables the ear, brain, and body to decode much of the sound enabling us to, for example, differentiate a tom-tom from a finger tap on some other surface. Further, the body acts to help us perceive audio down to a few cycles per second. As such, differential AI driven brain activity analytics are commonly employed as part of the testing to ensure definition of the actual physiological and perceptual hearing limits using complex, real world audio signals across transient, harmonics, timbral, and other detail, rather than using common frequency based and other audiology and related testing.

Similarly, as some studies have moved away from simple sine wave data used in testing hearing sensitivity and limits, to audio test sources with a range of transient, harmonic, phase and timbral complexity, those studies have begun to see that hearing and perception are a whole brain plus body experience, meaning that engineering and related methods need to take these factors into account in order to be reflective of real world human hearing.

Numerous other capabilities include the ability to dramatically improve the perceived quality of the sound even when compressed. This is due to the fact that the system starts with a significantly higher resolution sonic landscape that more accurately reflects the limits of human hearing, rather than an already diminished and compromised one that does not include much of the sonic image to begin with. Among other things, this results in increased perceived quality with significantly reduced audio file sizes, along with commensurately reduced resulting bandwidths and storage requirements.

The unique inventive method of the present invention employs a hybrid digital-analog format that uses a type of Pulse Density Modulation (PDM) and process that interoperates with traditional Pulse Code Modulation (PCM) systems. Because of the unique implementation described in the preferred embodiment, the system is able to bypass the requirement of a digital to analog conversion stage (DAC) and the associated jitter, sampling distortion, quantization noise, intermodulation distortion, phase distortion, and various nonlinear issues created by a DAC stage. It is able to bypass these issues because the system enables the ability to output the digital equivalent of an analog signal, hence the labeling of a hybrid digital-analog format.

Figure 4:
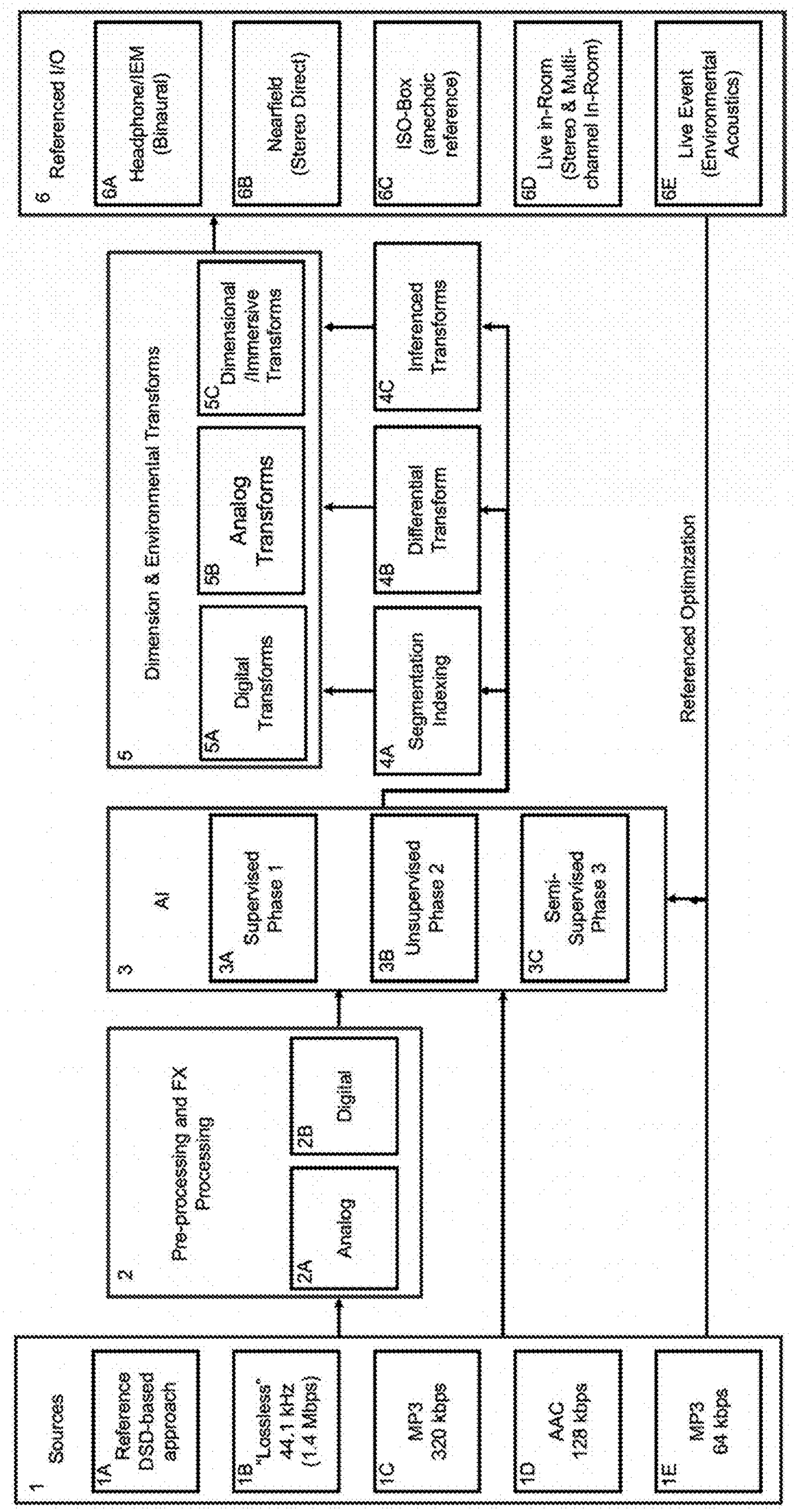
FIG. 4 illustrates a schematic diagram for a system for enhancing an input audio source according to one embodiment of the present invention.

FIG. 4 illustrates a schematic diagram for a system for enhancing an input audio source according to one embodiment of the present invention. As shown in FIG. 4, there are six main stages of the system of the present invention, defined as stages 1 through 6. Beginning with the input source, and proceeding to the final output, the following stages define the steps of a system able to be used for various types of input source and for various types of audio processing. The system is able to be used for two general purposes: (1) training and transfer learning, and (2) inferenced transcoding and processing operations. In both modes, the same stages are implemented, although the specific contents of each stage shift, as described below.

The first step of the system is sourcing. While any analog or digital audio source type, format, sample rate, or bit-depth is able to be used for training or inference, having a range of relative quality levels facilitates the training by enabling the deep learning neural network to derive differential, associative, and other patterns inherent to each source type (and the related quality levels of each source type) to establish pattern recognition and discrimination within a neural network model. The sourcing for the system is able to derive from any analog or digital source, whether locally provided as a digital file, introduced as an analog source, streamed or otherwise, and the subsequent stages of the system process the sourced data further. Examples of comparative sources able to be acquired and organized according to the present invention are shown as items 1A-1E in FIG. 4, but one of ordinary skill in the art will understand that other types of audio data are also able to be used in place of those shown.

In one embodiment, a Direct Stream Digital source, or other high quality audio source, as indicated in 1A, is used as a reference, or ground truth source. Within the set of data constituting the ground truth source, the system is able to include a unique set of audio sourcing across many types of audio examples, including, but not limited to, a range of: musical instrument types, musical styles, ambient/room interactions, compression levels, dynamics, timbres, overtones, harmonics, and/or other types of audio source types. The use of ground truth source data allows for the system to train on audio data, including content below the noise floor that is eliminated in prior art systems. In one embodiment, the audio data includes information at least 1 dB below the noise floor. In one embodiment, the audio data includes information at least 5 dB below the noise floor. In one embodiment, the audio data includes information at least 10 dB below the noise floor. In one embodiment, the audio data includes information at least 25 dB below the noise floor. In one embodiment, the audio data includes information at least 50 dB below the noise floor. In one embodiment, the audio data includes information at least 70 dB below the noise floor.

In one preferred embodiment, the system is able to use, for example, sources including one or more pristine sources of analog and digital recordings, such as high sample rate DSD audio recording acquired using high quality gear. Together with any limits, improvements, and/or enhancements made in the acquisition and recording process as described herein, the source in 1A effectively provides an exemplary upper quality limit for the available source examples. As described herein, there are a range of improvements made via artificial intelligence module and other related subcomponents of the system, which further elevate the capabilities of this source type and thereby the invention. This improvement is possible due to AI-identified inherent noise and related patterns even in high quality audio data, together with human perceptual adaptations where such perception is possible.

In one embodiment, source 1B includes the most widely available high quality source type used in recording, and is often referred to as lossless, “CD quality” or by the specific sampling rate and bit depth commonly used, such as 44.1 kHz at 16 bits, 96 kHz at 24 bits or another similar specification. As with 1A described above, source 1B is able to be supplied across a wide range of source types.

Fidelity relative to the original source material is diminished proceeding from 1C (e.g., MP3 at 320 kbps), to 1D (e.g., Apple AAC at 128 kbps), and ultimately to 1E (e.g., MP3 at 64 kbps). While the source types depicted in FIG. 4 represent one preferred embodiment of the present invention, the actual specific levels of quality and source types are not limited to these, just as the specific audio source types and the ways in which they differ are also able to vary. These variations and options are useful in training, transfer learning and other adaptations for different purposes.

The next stage, stage 2, is a pre-processing and FX processing stage, including data aggregation and augmentation. In the training mode of operation, stage 2 is where the system employs standard types of audio processing variations, including compression, equalization, and/or other processes, and then turns the pre-processed and post-processed examples of these transformed audio files into digital spectrographs able to be used for AI training in stage 3. Stage 2 provides for representative training examples in the formats most efficiently usable for AI training.

The AI module utilized and trained in stage 3 is able to include supervised learning models (3A), unsupervised learning models (3B), and/or semi-supervised learning models (3C). In one embodiment, the machine learning module utilizes grokking to understand the source data provided and to therefore train the model. In this stage, the system both trains the deep learning models, and secondarily derives the abilities to: (a) segment audio data by character, quality/fidelity, genre, compression rate, styles and other attributes, enabling derivation of further training, workflow processing and output control options; and (b) create workflow and related indexes to be used for determining settings and step related variations to be used in the later stages for various restoration and/or transforms and/or effects as described herein. One of ordinary skill in the art will understand that the term "segmentation" in this case is not limited to its use in the prior art as meaning dividing the audio data into particular tracks or segments, but includes grouping multiple sources of audio data by particular traits or qualities, including those mentioned above. Further, this is able to be used to extend an API for other operational and deployment purposes, such as a Platform as a Service, to enter a transfer learning mode (e.g., for other markets and industries), and/or other uses.

The system is also able to provide AI-enabled direct processing transforms to be used to enhance, extend, or otherwise modify audio files directly for an intended purpose. This is based on applying the associative and differential factors across the audio data types to a range of transform options as described herein. Providing enough examples of the right types to enable the AI in stage 3 to derive weights, biases, activation settings, and associated transforms for the deep learning model to be used in stage 4 is essential.

Stage 4 is the indexing and transform optimization stage, enabling a user to selectively employ the information and capabilities derived from the earlier stages to set and employ the necessary transforms. Standard interface dashboards and related controls enable user selective choices, which are able to be intelligently automated via a scripting API. Specifically, the API is able to receive user selection to leverage a prior input and processing for remastering an audio file more optimally for a particular format or modality (e.g., DOLBY ATMOS), or recover information lost as a result of, for example, compression or other factors. In summary, this stage provides for specific deployment that affects how the audio is transformed, and thus the form and qualities of the final output.

In step 4A, the system is able to employ AI-derived segmentation analysis, deriving and determining which subsequent transform options and settings best suit the input audio given its state, style, or other characteristics, and given the desired delivery modality (e.g., live, studio, headphones, etc.). In step 4B, the artificial intelligence module of the system is able to choose whether to apply differential processing to the audio to achieve a restoration, improvement, modification, or creative function, beyond any mastering grade restoration. Transforms able to be applied by the artificial intelligence module in the system of the present invention include, but are not limited to, recovering information of reduced quality audio, removing unwanted acoustics or noise, and/or other functions. In step 4C, automated AI inferencing is able to be employed to automatically achieve a selected objective, based on inherent limits of the source material in comparison to patterned references inherent in the trained neural network. In step 4C, due to the inherent support for transfer learning, the system is also able to use differential examples to creatively direct style, level, equalization, or other transformations.

In stage 5, the system selectively employs one or more transforms (e.g., analog (5A), digital (5B) or dimensional (5C) transforms) for the audio, based on the creative or specific usage or other objectives. In one embodiment, it is at this stage where the system is able to employ transforms suitable for specific formats (e.g., DOLBY ATMOS) or have a glue-pass (i.e., a purpose-directed compression step) execute a compression or other function. Stage 5 provides the necessary controls to apply temporal-spatial, encoding/transcoding, and channel related bridging and transforms to interface with any real-world application, while providing mitigation and enhancement support for environmental, output/playback devices, and other environmental factors. Together with the segmentation and related indexing enabled in stage 4, and associated transform control options in stage 5, this collectively enables flexible output interfacing that constitutes an important benefit of the present invention.

Stage 6 is selectively employed in one of two primary modes. The first mode generates real-world based output used to optimize the training of the AI for a particular purpose. This stage uniquely enables the AI to employ generative processes and other means for deep levels of realism or other desired effects. Unlike prior approaches that used synthetic means to introduce ambience, dynamics, channelization, and immersion and other factors, humans are extremely sensitive to even minor relative quantization, equalization, phase, and other differences, which destroy a sense of accuracy and realism. The application of this stage, together with the use of a 1A reference standard, lesser quality examples of 1B-1E, and associated constraints, ensures that the described levels of fundamental realism, fidelity and creative objectives are supported.

The second mode of operation is to apply desired optimization for a given target purpose, such as for binaural audio (6A), for stereo mastering (6B), for style/sound/timbral character purposes such as by impulse response generation (6C), for ATMOS or other multichannel purposes (6D), for live event purposes such as transfer control (6E), and for other targeted purposes.

While the referenced I/O types listed in stage 6 as part of the preferred embodiment noted herein are supportive of the purpose of this invention, it must be noted that this invention is very specifically designed to be modularly adaptive, such that other types of I/O, even ones not related to audio/music, are easily able to be inserted within the architecture of the present invention. In fact, the architecture of this invention is very specifically architected to inherently support such options. Therefore, the diagram shown in FIG. 4 should not be read as limiting with regard to the output forms and modalities able to be supported by the present invention.

This capability is able to be used to enable the AI and supporting subsystems and phases to optimize and support a wide range of interfacing with other software or hardware for other purposes. It is an inherent part of this design to be able to selectively leverage other analog, digital and related hardware, and software together with the core system.

FIGS. 5-10 illustrate sequential flow diagrams for select stages described in the foregoing.

Figure 5:
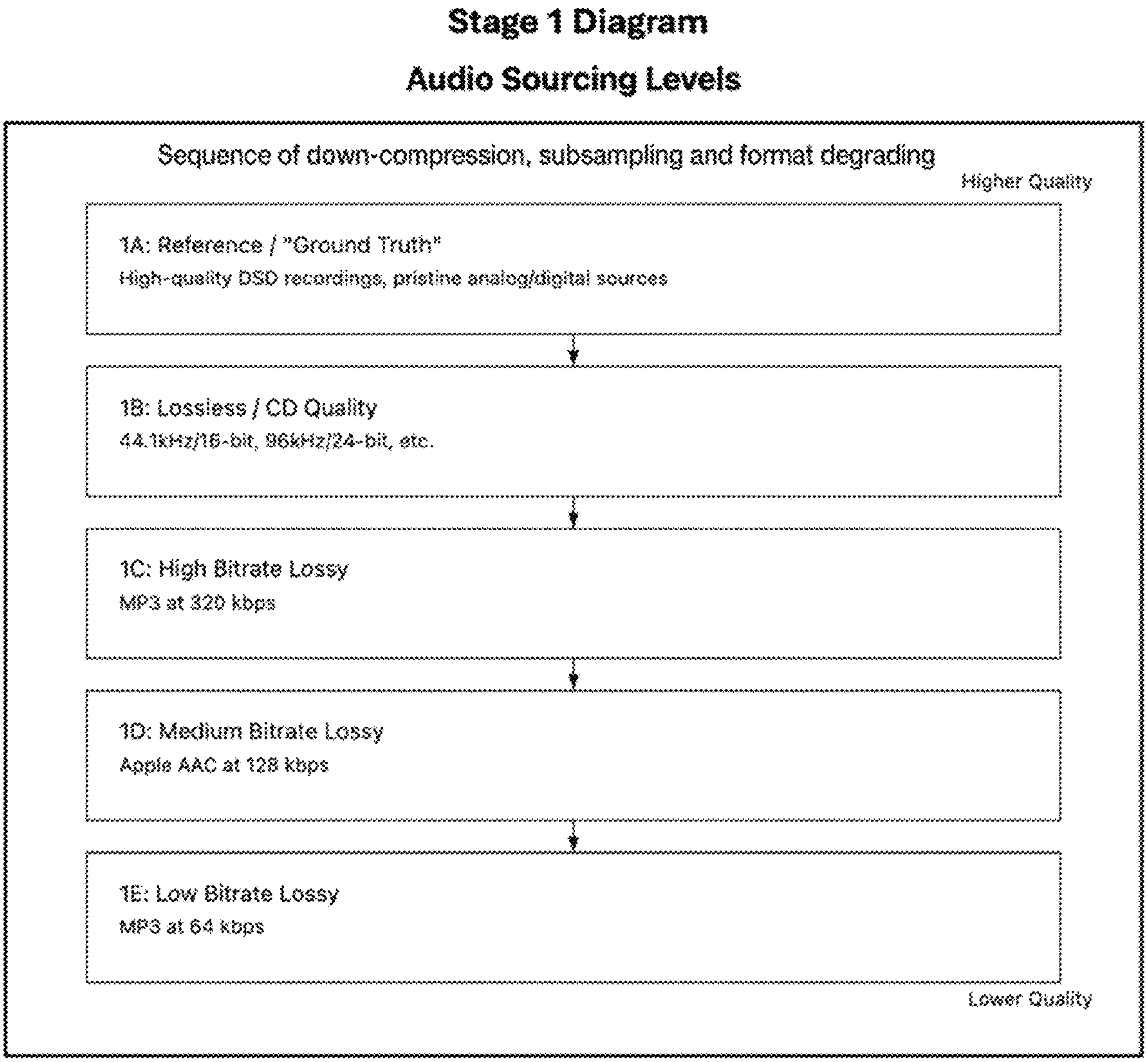
FIG. 5 is a flow diagram for an audio sourcing stage of an audio restoration or enhancement process according to one embodiment of the present invention.

FIG. 5 is a flow diagram for an audio sourcing stage of an audio restoration or enhancement process according to one embodiment of the present invention. FIG. 5 shows typical levels and types of example training data for enabling the model's training based on the differential factors between the levels of accuracy and fidelity between the ground truth (1A) Reference Ground Truth and each level of truncation, compression, artifact-induction, and related factors for sources 1B through 1E. Utilizing a wide variety of levels of example training types and levels helps to make the model of the present invention more effective and robust.

Figure 6:
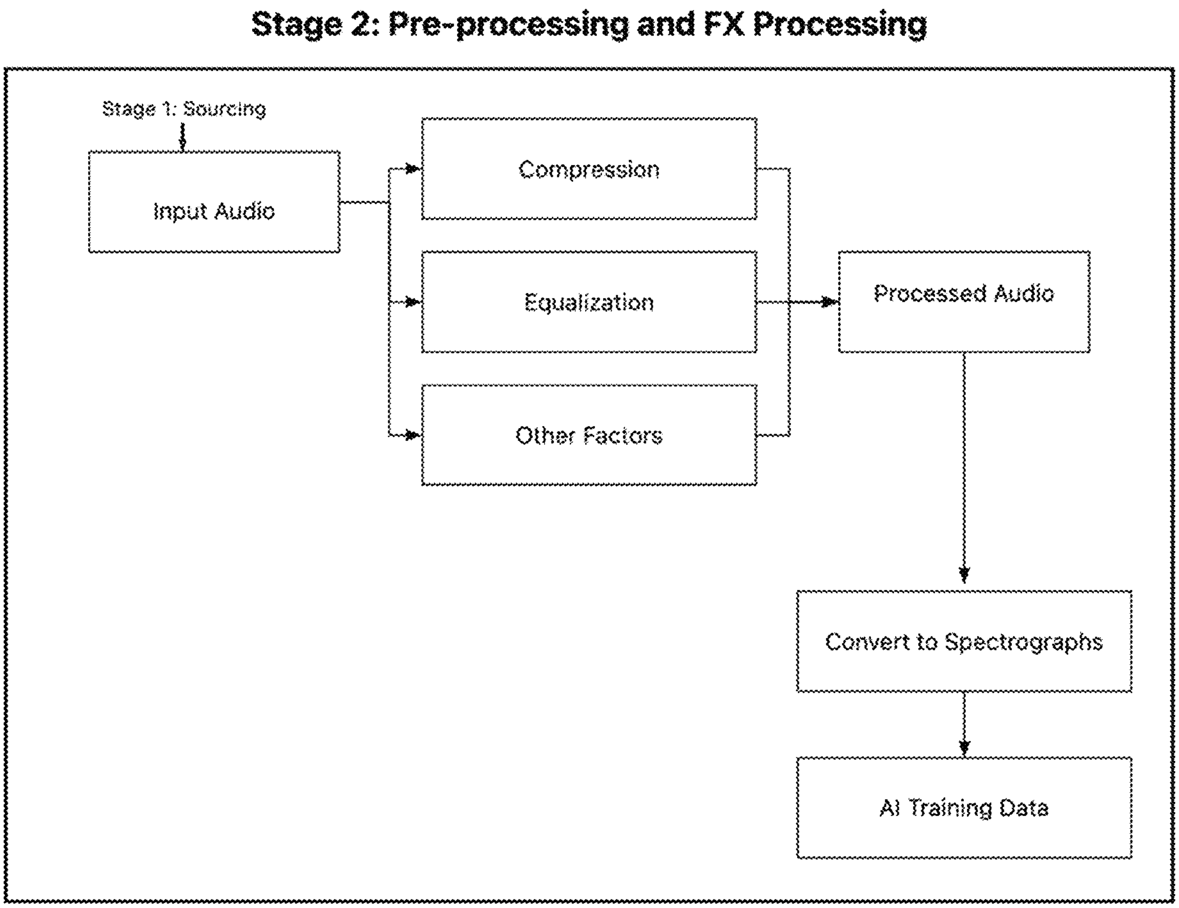
FIG. 6 is a flow diagram for a preprocessing and FX processing stage of an audio restoration or enhancement process according to one embodiment of the present invention.

FIG. 6 is a flow diagram for a preprocessing and FX processing stage of an audio restoration or enhancement process according to one embodiment of the present invention. FIG. 6 diagrams how the system of the present invention preprocesses input/source audio data to create additional levels of synthetic training media/data, by transforming synthetically created ground truth training media/data into various levels of bandwidth-degraded, compression-degraded, sampling rate and format-degraded training examples.

Figure 7:
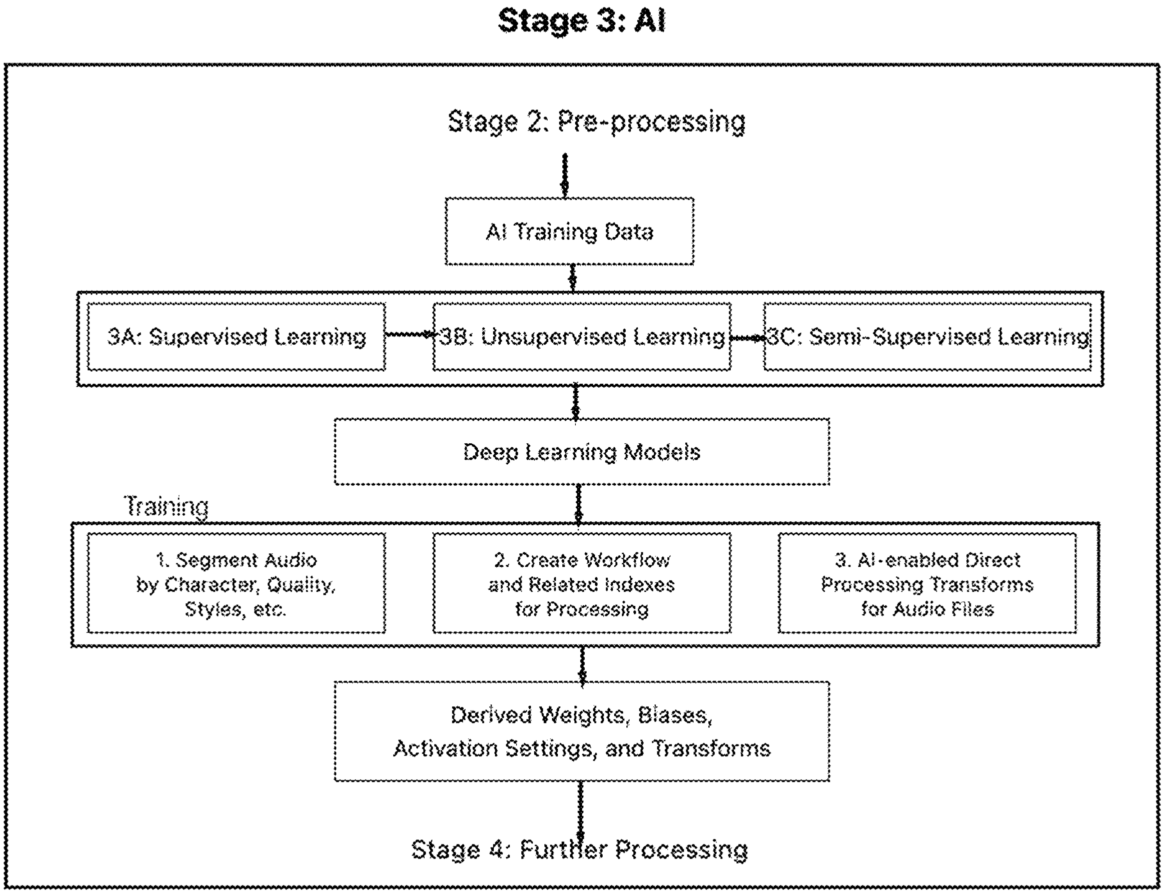
FIG. 7 is a flow diagram for an artificial intelligence (AI) training and deep learning model stage of an audio restoration or enhancement process according to one embodiment of the present invention.

FIG. 7 is a flow diagram for an artificial intelligence (AI) training and deep learning model stage of an audio restoration or enhancement process, according to one embodiment of the present invention. FIG. 7 is a depiction of the training and deriving of optimized training results by the present system. The system leverages an encoder-decoder architecture, including using a Swin Transformer in a U-Net style architecture, and employs a multi-scale transformer architecture with a series of transformer blocks that are applied at different levels of the feature hierarchy. The system therefore leverages a transformer-based attention head that extracts scale-independent and related feature details from the media/data examples as defined.

The system trains the network to map from low-quality inputs to high-quality outputs by employing a curriculum learning approach: starting with easier restoration examples using supervised learning of structured example data, and gradually increasing complexity as the system moves to substantially unsupervised learning of largely unstructured data. The system combines multiple loss terms, including, by way of example and not limitation: a) element-wise loss (e.g., L1 or L2) for defining overall structure based on the highest quality data/media option examples; b) perceptual loss using AI models capable of processing spectrographic image and similar options (e.g., Vision Transformer (ViT) and its scale-independent AI network variants such as Pyramid Vision Transformer (PVT)) to capture features at various levels); and c) adversarial loss (generative adversarial network (GAN)-based) to identify and map to highest perceptual quality media/data with the highest fidelity details.

The model is trained progressively on different levels of degradation and limitations, starting with mild degradations (e.g., CD-Quality) and gradually introducing progressively more severe degradations as indicated in FIG. 5 (e.g., low bit rate MP3).

The system implements extensive data synthesis and augmentation to increase the model's generalization ability and provide a greater range and number of examples, including randomized bandwidth truncations, phase shifts, and related transforms, at varying levels of degradation. The model is modular, such that the system is able to support future training options including and beyond grokking.

The system pre-trains on a large set of diverse audio-spectrogram conversions (e.g. MEL spectrograms, etc.) before doing any fine-tuned training, leveraging principles of transfer learning.

To evaluate the model, the system uses both quantitative metrics (PSNR, identified/restored bandwidth, compression, and dynamics) and qualitative assessments based on typical Human Reinforcement Learning feedback. Additional metrics able to be used include, but are not limited to, signal-to-noise ratio (SNR) (indicating level of desired signal relative to background noise, with higher values indicating better quality), total harmonic distortion (THD) (quantifying the presence of harmonic distortion in the signal, with lower values indicating less distortion and higher fidelity), perceptual evaluation of audio quality (PEAQ) (based on an ITU-R BS.1387 standard for objective measurement of perceived audio quality with a score from 0 (poor) to 5 (excellent)), mean opinion score (MOS) (a subjective measure with listeners rating audio quality on a scale of 1 to 5), frequency response (measuring how well the system reproduces different frequencies, which is ideally flat across a spectrum of 2 Hz to 100 kHz), intermodulation distortion (IMD) (measuring distortion caused by interaction between different frequencies, with lower values indicating better fidelity), dynamic range (i.e., the ratio between the loudest and quietest sounds in the audio, with higher values usually indicating better quality), spectral flatness (measuring how noise-like or tone-like a signal is in comparison to ground truth data, which is useful for accessing the presence of unwanted tonal components and phase anomalies), cepstral distance (measuring the difference between two audio signals in the cepstral acoustic domain, with smaller distances indicating higher similarity and, typically, better fidelity), perceptual evaluation of speech/vocal quality (PESQ) (an ITU-T standard for assessing speech quality with scores from −0.5 to 4.5, with higher scores indicating better quality), perceptual objective listening quality analysis (POLQA) (i.e., un updated version of PESQ able to be used for super wideband audio, and evaluated between 1 and 5), articulation index (AI) or speech/vocal intelligibility index (SII) (measuring the intelligibility of speech in the presence of noise, with scores from 0 to 1, and with higher values indicating better intelligibility), modulation transfer function (MTF) (assessing how well a system preserves amplitude modulations across frequencies, which is important for maintaining clarity and definition in complex audio), noise criteria (NC) or noise rating (NR) curves (used to assess background noise levels in different environments, with lower numbers indicating quieter environments), loudness (e.g., measured in loudness units relative to full scale (LUFS), which is useful for ensuring consistent loudness across different audio materials), short-time objective intelligibility (STOI) (measuring intelligibility of speech signals in noise conditions, with scores from 0 to 1 and with higher values indicating better intelligibility), binaural room impulse response (BRIR) metrics (i.e., various metrics derived from BRIR measurements to assess spatial audio quality including interaural cross correlation (IACC) and early decay time (EDT)), spectral centroid (indicating where the "center of mass" of the spectrum is located for assessing brightness or dullness of a sound), weighted spectral slope (WSS) (measuring the difference in spectral slopes between original and processed speech, with lower values indicating higher similarity), and log likelihood ratio (LLR) (comparing differences between linear predictive coding (LPC) coefficients of the original and processed speech, with lower values indicating higher similarity).

Figure 8:
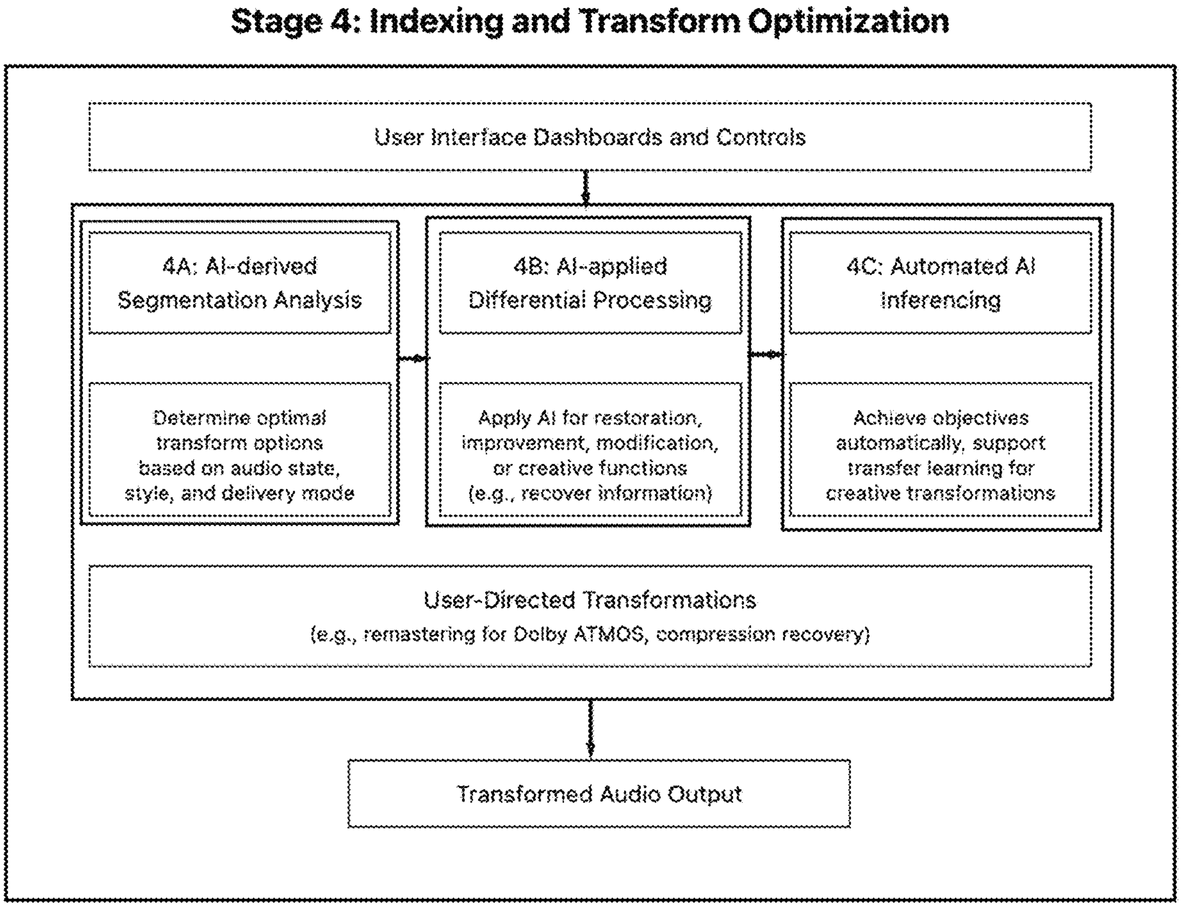
FIG. 8 is a flow diagram for an indexing and transform optimization stage of an audio restoration or enhancement process according to one embodiment of the present invention.

The system is able to train the model using degradation type/level as an additional input to the transformers taken in sequence and in-parallel, and apply a cascaded approach where the output is iteratively refined through multiple stages as described in FIG. 8.

FIG. 8 is a flow diagram for an indexing and transform optimization stage of an audio restoration or enhancement process according to one embodiment of the present invention. FIG. 8 further delineates the processing and related handling of the media based on a segmented set of styles, delivery/output formats, and related options. The system also allows for selective control of the system based on directed input and selection of options by human and/or AI-automated processes. For example, in one embodiment, the indexing and transform optimization stage includes a first AI-based segmentation analysis substage, in which optimal transform options are determined based on audio state, style, and delivery mode. This segmentation analysis then leads to an AI-based differential processing substage, in which the AI is applied for restoration, improvement, modification, or for creative functions (e.g., recovering information). After the differential processing, the audio data is then able to be put through an automated AI-based inferencing substage, in which objectives are achieved automatically, with support for transfer learning for other creative transformations. This stage is able to operate based on user-directed transformations for particular known types of conversion (e.g., remasters for DOLBY ATMOS, compression, recovery, etc.).

Figure 9:
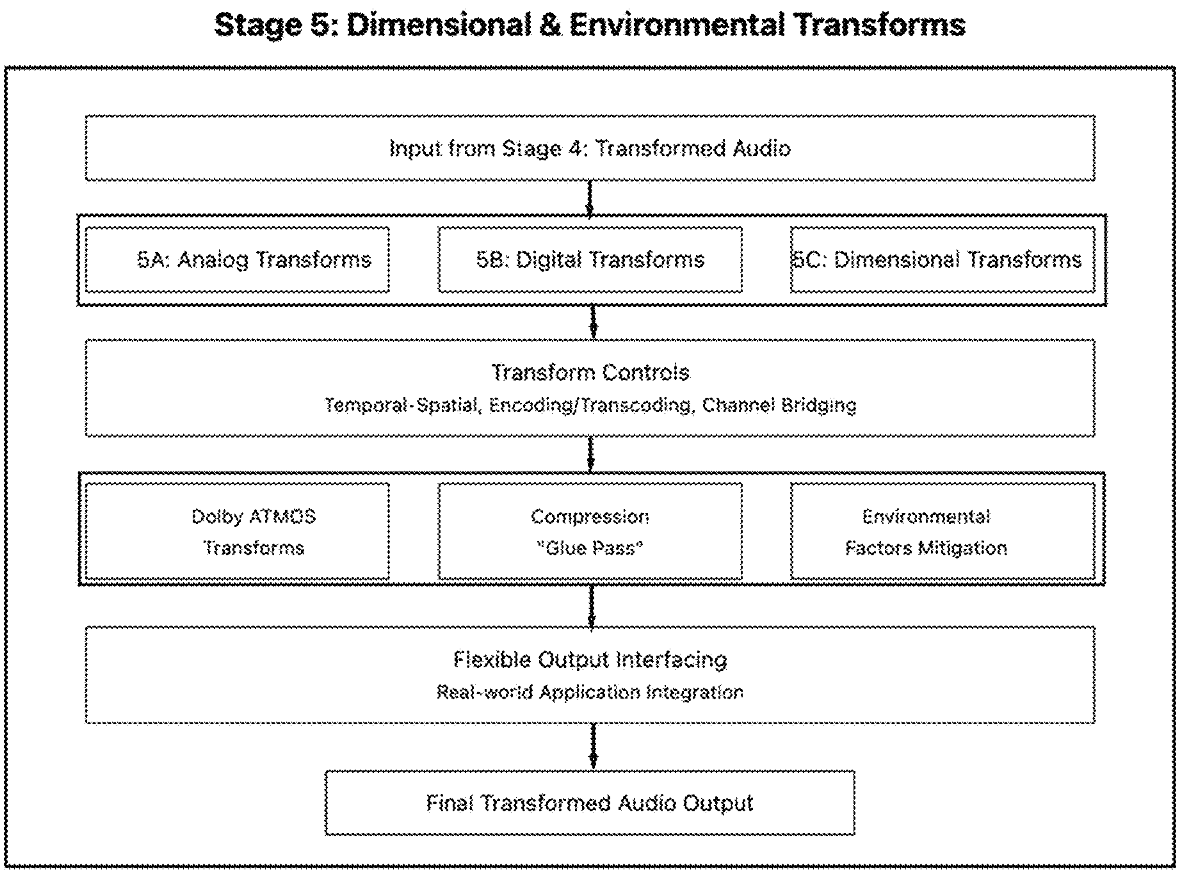
FIG. 9 is a flow diagram for a dimensional and environmental transform stage of an audio restoration or enhancement process according to one embodiment of the present invention.

FIG. 9 is a flow diagram for a dimensional and environmental transform stage of an audio restoration or enhancement process according to one embodiment of the present invention. FIG. 9 provides additional sets of important transforms able to be applied to support the range of typical analog and digital formats and standards, such as immersive, multi-channel, stereo, and related real-world applications and usage that must be handled. These transforms are able to include analog, digital and dimensional transforms, with controls for each transform, including temporal-spatial, encoding/transcoding, and channel bridging. Additional specific transforms are also able to be applied, including but not limited to those associated with particular formats (e.g., DOLBY ATMOS), a compression "glue pass", and/or environmental factors mitigation. The transformed data is able to then pass through a flexible output interface for a real-world application to produce a final transformed audio output.

Figure 10:
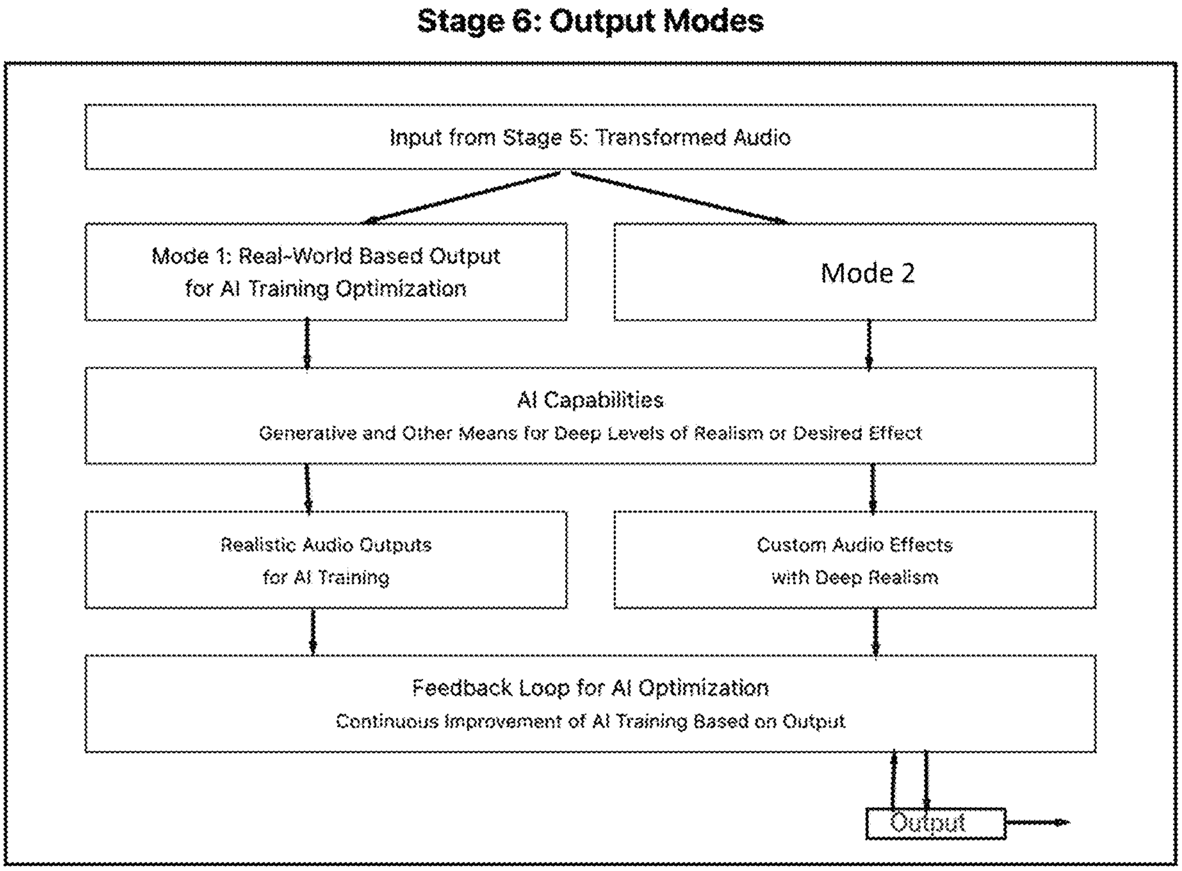
FIG. 10 is a flow diagram for an output mode stage of an audio restoration or enhancement process according to one embodiment of the present invention.

FIG. 10 is a flow diagram for an output mode stage of an audio restoration or enhancement process according to one embodiment of the present invention. FIG. 10 diagrams the modular approach of the present invention for supporting currently defined standards and supported uses for various use cases. The modular approach also allows the system to support integration of new or otherwise additional formats. FIG. 10 illustrates that Stage 6 of the audio restoration or enhancement process provides for support for other optional use cases, such as gaming, immersive realism such as in mixed reality, hyper-realism, BCI-enabled deep realism, and other such applications. Finally, the architecture supports feedback into the system for progressive optimization based on AI-driven processes.

Figure 11:
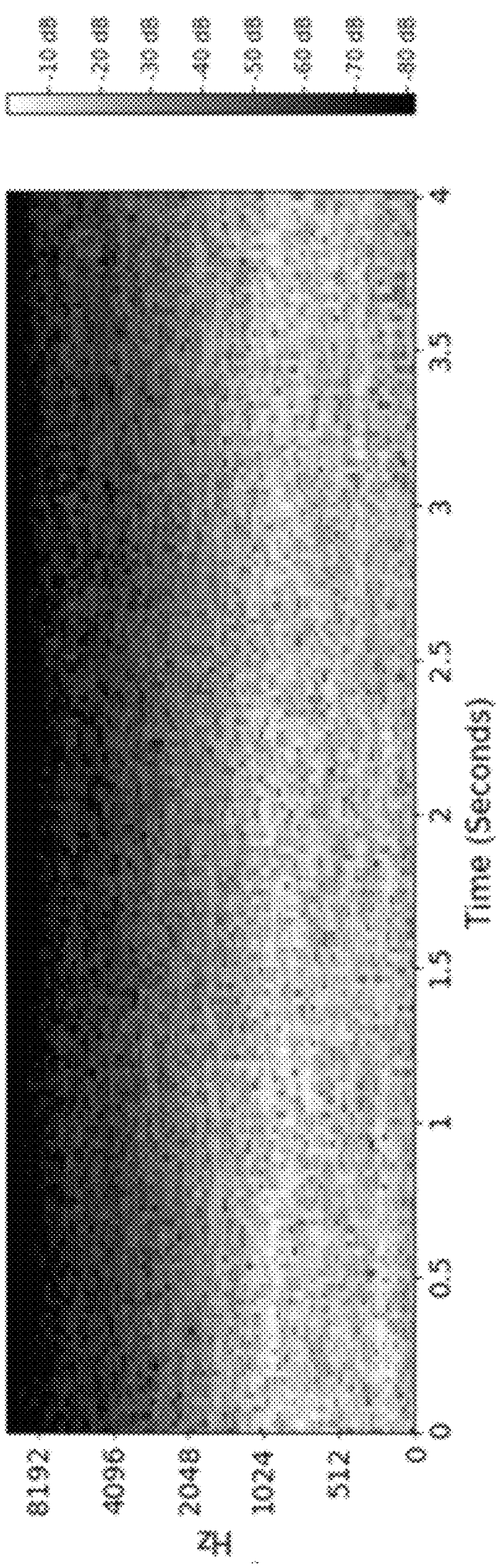
FIG. 11 is a signal diagram for a signal formatted with Pulse Code Modulation without application of improvements provided by the present invention.
Figure 12:
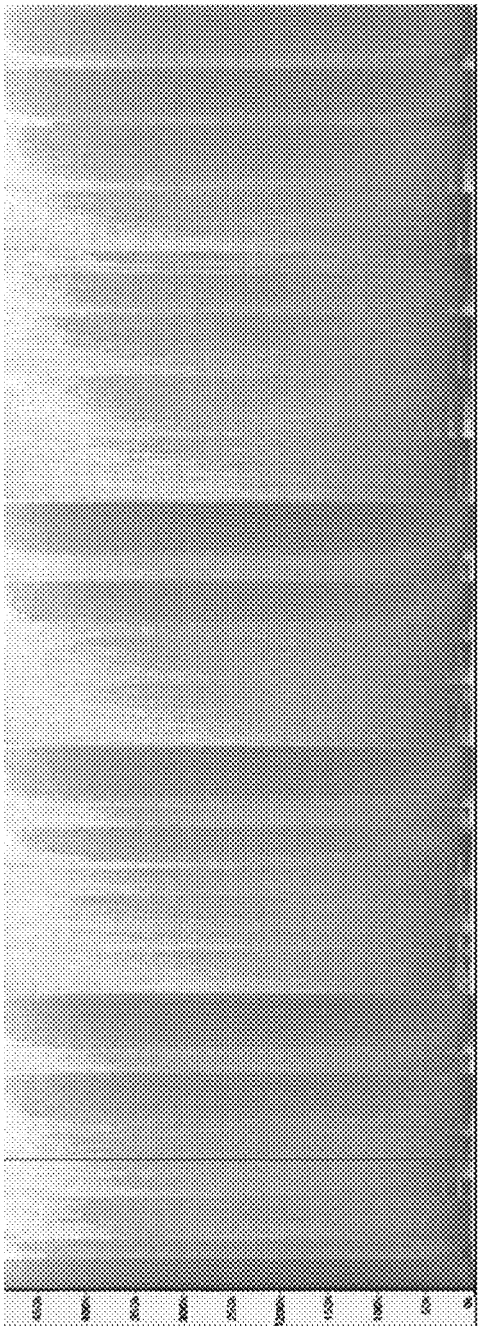
FIG. 12 is a signal diagram for a Pulse Density Modulated Signal according to one embodiment of the present invention.

Turning the attention now to the PDM method of lossless processing capability of the system of the present invention, FIG. 11 depicts a signal format traditionally used via Pulse Code Modulation (PCM) without any improvements enabled by the present system. Alternatively, FIG. 12 shows a version of the spectrum with PDM sampled at 5000,000 Hz as part of the present system, showing the spectrum devoid of aliasing, phase, distortion, and other artifacts.

Without the ability to eliminate phase, quantization, transient, frequency, and sampling-related artifacts and distortion, which is enabled by the present invention, the benefits and capabilities described herein would not be possible.

Figure 13:
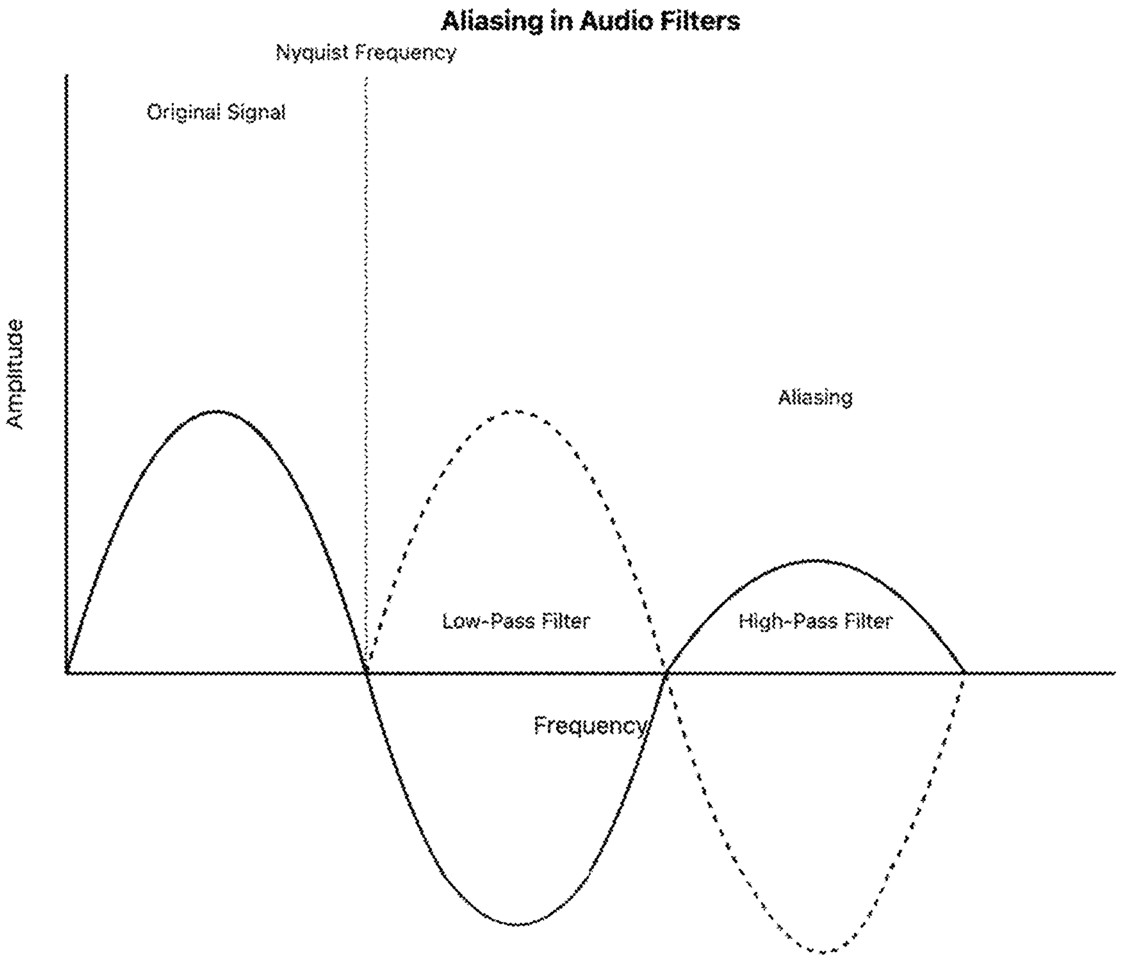
FIG. 13 is a graph showing aliasing in the use of low-pass or high-pass filters for audio data.
Figure 14:
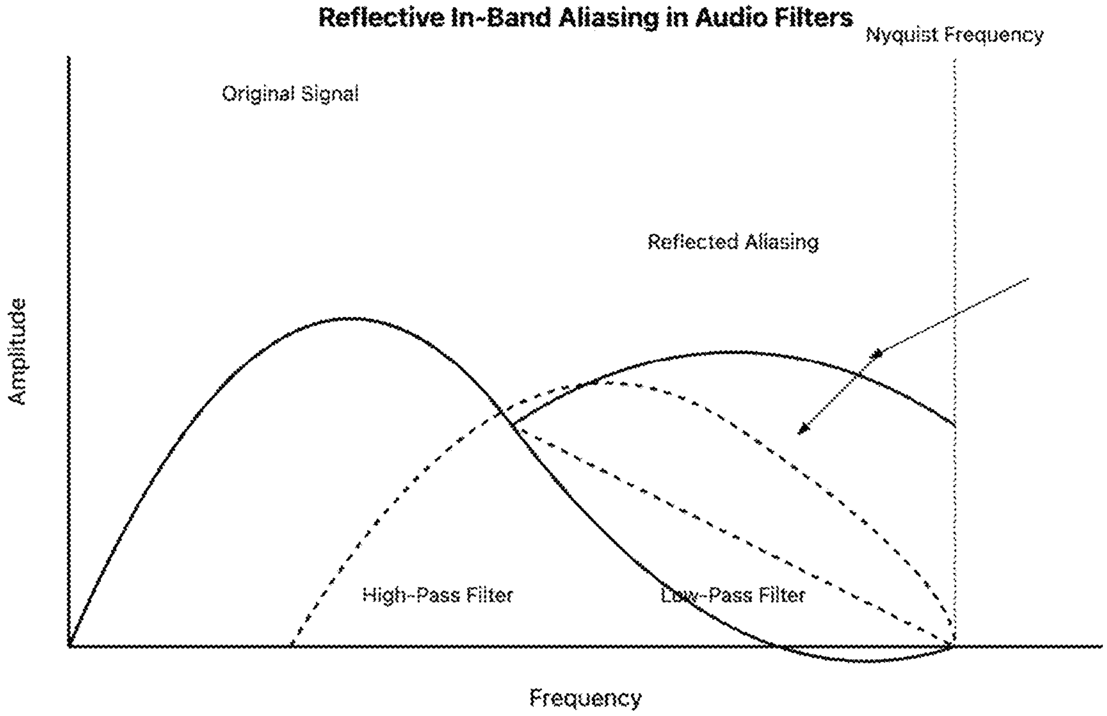
FIG. 14 is a graph showing reflective in-band aliasing for high-pass and low-pass audio filters.

FIG. 13 is a graph showing aliasing in the use of low-pass or high-pass filters for audio data. As shown in FIG. 13, traditional PCM causes aliasing and therefore artifacts appear above the Nyquist frequency. While many systems employing PCM assume 20 Hz to 20 kHz to be the range of perceptible audio and design filters accordingly, as previously noted, such assumptions are faulty and therefore the artifacts induced in such PCM methods are perceptible. Furthermore, as shown in FIG. 14, even below the Nyquist frequency (i.e., below 20 kHz), reflected in-band aliasing occurs, affecting perceptible qualities of the sound, such as frequency, timbre, imaging, and other qualities. The ability to eliminate the need for low pass and high pass filtering in ground truth training and reference samples, as well as in the output generation workflow allows for the elimination of reflected in-band aliasing under the Nyquist frequency.

In addition to bypassing the frequency related effects, and the resulting tonal, timbral and intonation-related impact on the sound, the system therefore also enables the elimination of phase anomalous effects that all prior and currently available methods introduce to analog and digitized audio. The result of this is that imaging, dimensional characteristics, and the localization and positional representations of the original emitting elements will not be impacted during new recording and output. Also, the ability to apply the AI-driven semantic pattern identification of phase effects allows the system to eliminate them from existing recordings, resulting in the first and only system capable of such recovery and restoration.

Figure 16:
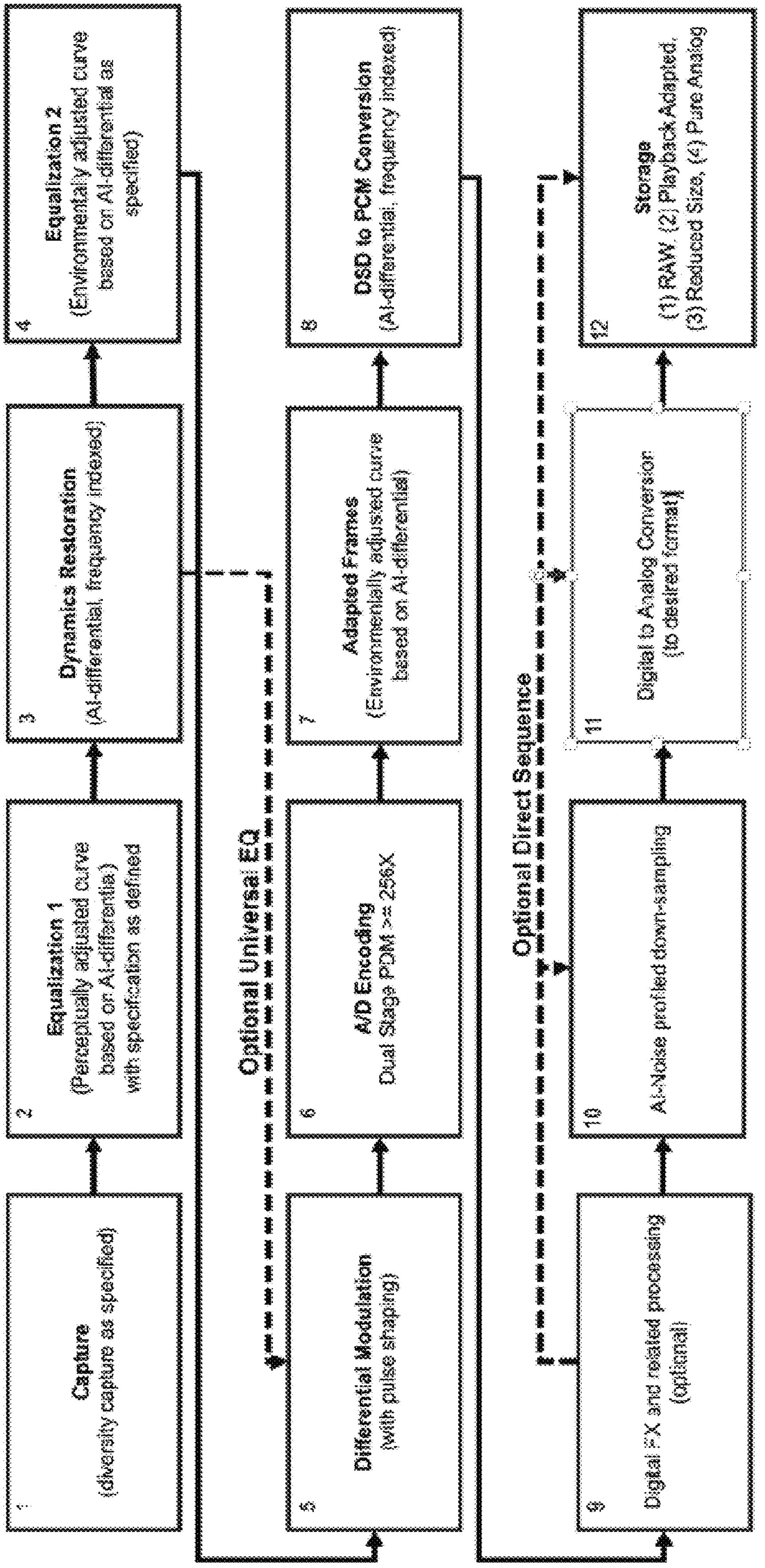
FIG. 16 is a schematic diagram of a pulse density modulation process for capturing and encoding lossless audio according to one embodiment of the present invention.

FIG. 16 is a schematic diagram of a pulse density modulation process for capturing and encoding lossless audio according to one embodiment of the present invention. In embodiments of the present invention there are 12 stages to the system and method, defined as stages 1 through 12 identified in FIG. 16 as 1-12. One of ordinary skill in the art will understand that the stages provided with reference to FIG. 16 are distinct from those described in FIG. 4, as the processes depicted in the diagrams of each figure are distinct. In embodiments of the present invention stages 1-8, along with one or more of stages 9-12 are required. Which of the stages 9-12 are chosen depends on the specific output format and usage that is required as described below.

Operational Sequence of System and Method

Figure 17:
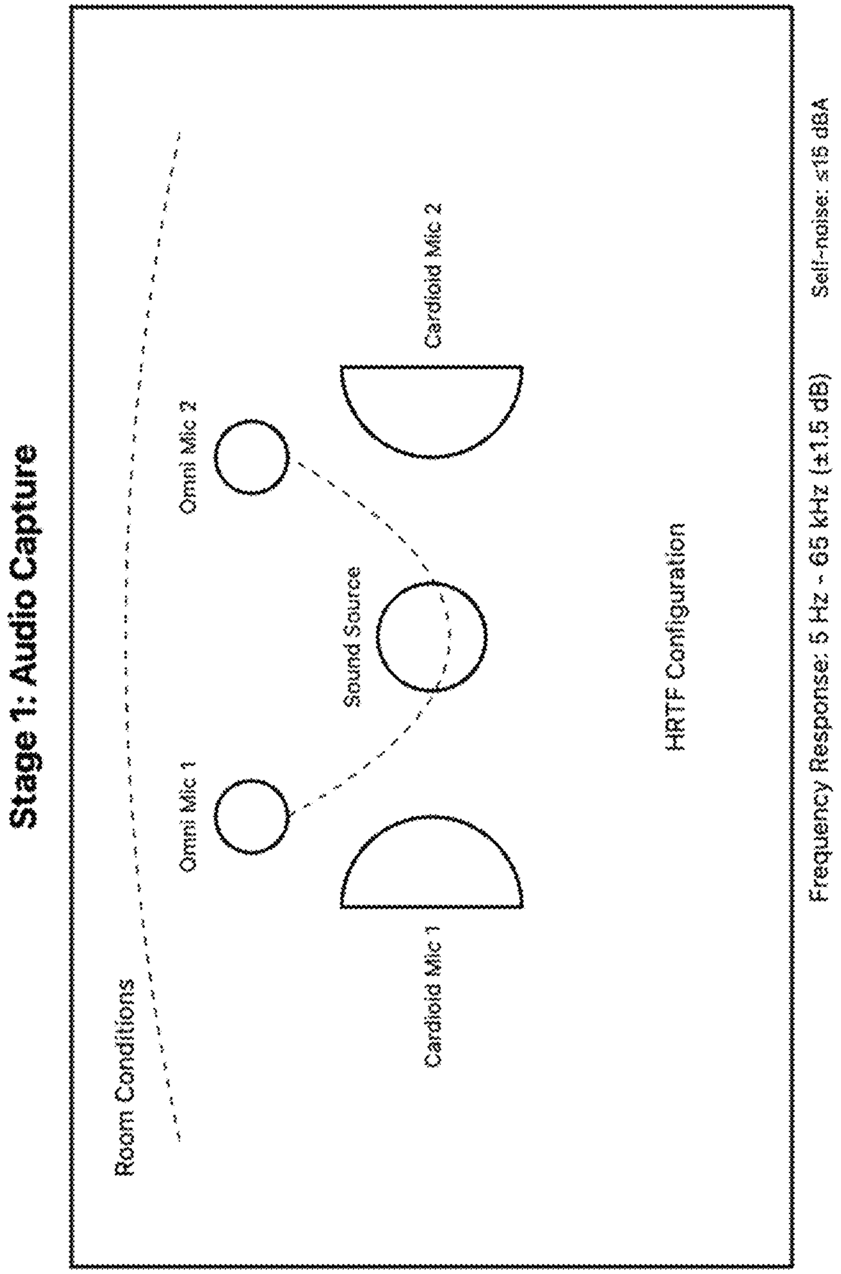
FIG. 17 is a schematic diagram of an audio capture stage of a pulse density modulation process according to one embodiment of the present invention.

As shown in FIG. 16 and more particularly in FIG. 17, stage 1 is the capture phase, which requires a minimum of the following configuration and enabling capabilities. A diversity microphone set of two (2) omni directional and two (2) cardioid microphones capable of being equalized to −1.5 dB and +1.5 dB, between <=5 Hz and >=65 kHz, and having a self-noise of no more than 15 dBA is used. First, the set is established for diversity capture using a stereo pair of cardioid pattern microphones as appropriate for the given distance, application, and recording purpose. Secondarily, for the same source, the microphone set includes a head related transfer function (HRTF)-configured omni-directional microphones complying with the above specification.

The defined two or more sets of microphones enable the invention to be able to differentiate between the room conditions and related frequency, phase, delay, and other responses and the sound source itself. While other numbers of sets of microphones are able to be used to enable a diversity recording capability, to be faithful to the extent and capabilities of human hearing and perception, the microphones need to, at a minimum, have the specifications and capabilities defined herein. Furthermore, while the microphone configuration described supports the necessary capture requirements as described, other configurations that support these requirements are also able to be used if available.

Figure 18:
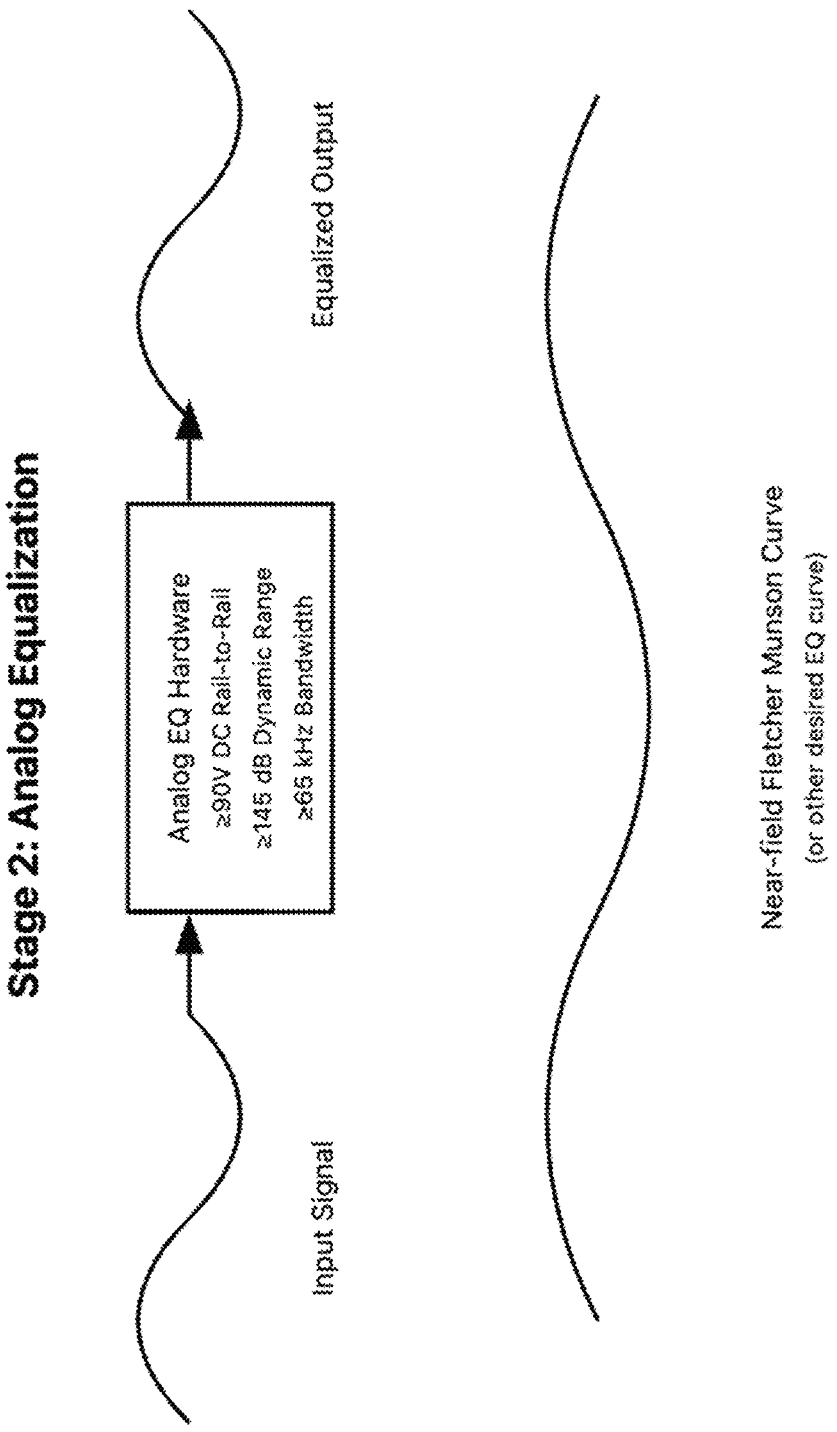
FIG. 18 is a schematic diagram of an analog equalization stage of a pulse density modulation process according to one embodiment of the present invention.

As shown in FIG. 18, stage 2 is an analog equalization stage using analog audio equalization hardware or similarly purposed devices appropriate to enable capture at 90V or greater rail to rail Direct Current (DC) voltage, to ensure support for a dynamic range of at least 145 dB at a slew rate that supports fundamental and partial harmonics through the entire capture range of 65 kHz or greater. The purpose is to ensure that the bandwidth is ideally at least 65 kHz, and that the inherent signal-to-noise ratio (SNR) and associated dynamic range supported is commensurate with Stage 6 and its requirements as described below. The goal of the equalization at this stage is to provide support for what is referred to in the industry as a near field Fletcher Munson or other desired equalization curve that is compliant with the final audio preference and related requirements, if any, prior to the final playback method, medium, or environment related requirements as further described below.

Figure 19:
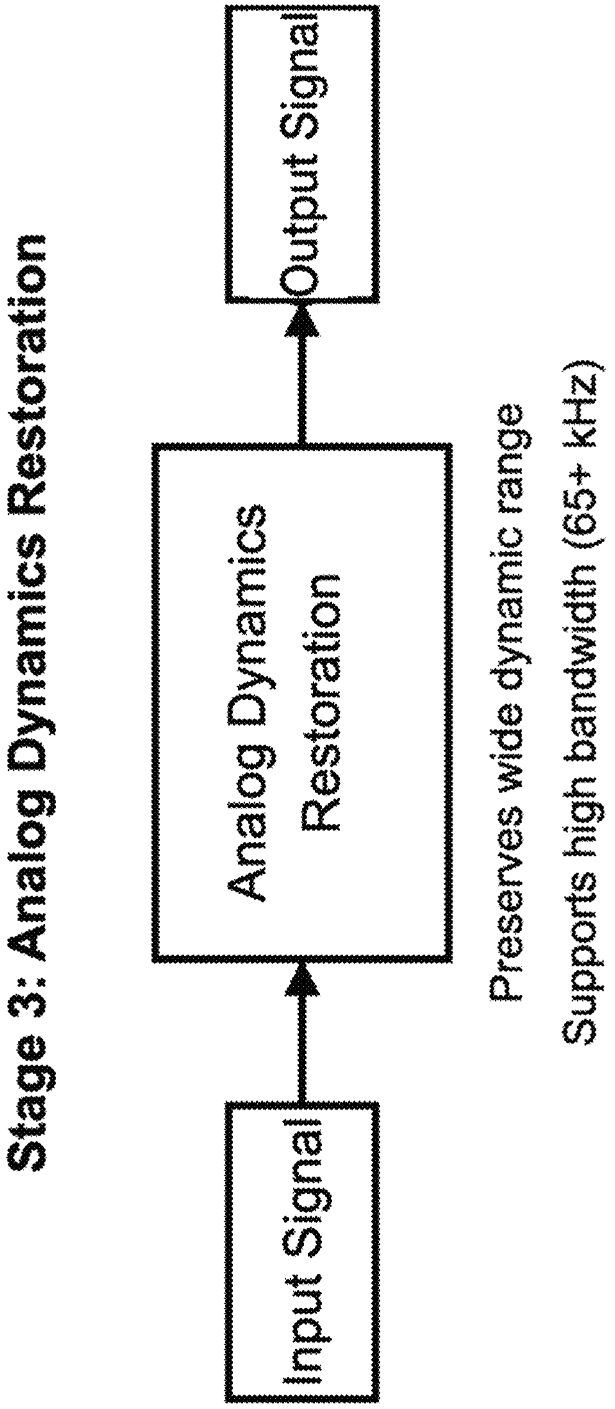
FIG. 19 is a schematic diagram of an analog dynamics restoration stage of a pulse density modulation process according to one embodiment of the present invention.

As shown in FIG. 19, stage 3 is an analog dynamics restoration stage via an analog audio compressor, or similarly purposed devices that do analog dynamics restoration appropriate to ensure capture at 90V or greater rail to rail DC voltage, to provide support for an SNR enabling a dynamic range of at least 145 dB at a slew rate that supports fundamental and partial harmonics through the entire capture range of 65 kHz or greater. The purpose is to ensure that the bandwidth is at least 65 kHz and that the inherent signal to noise ratio and associated dynamic range supported is commensurate with the analogous limits of Stage 6 as described below.

Figure 20:
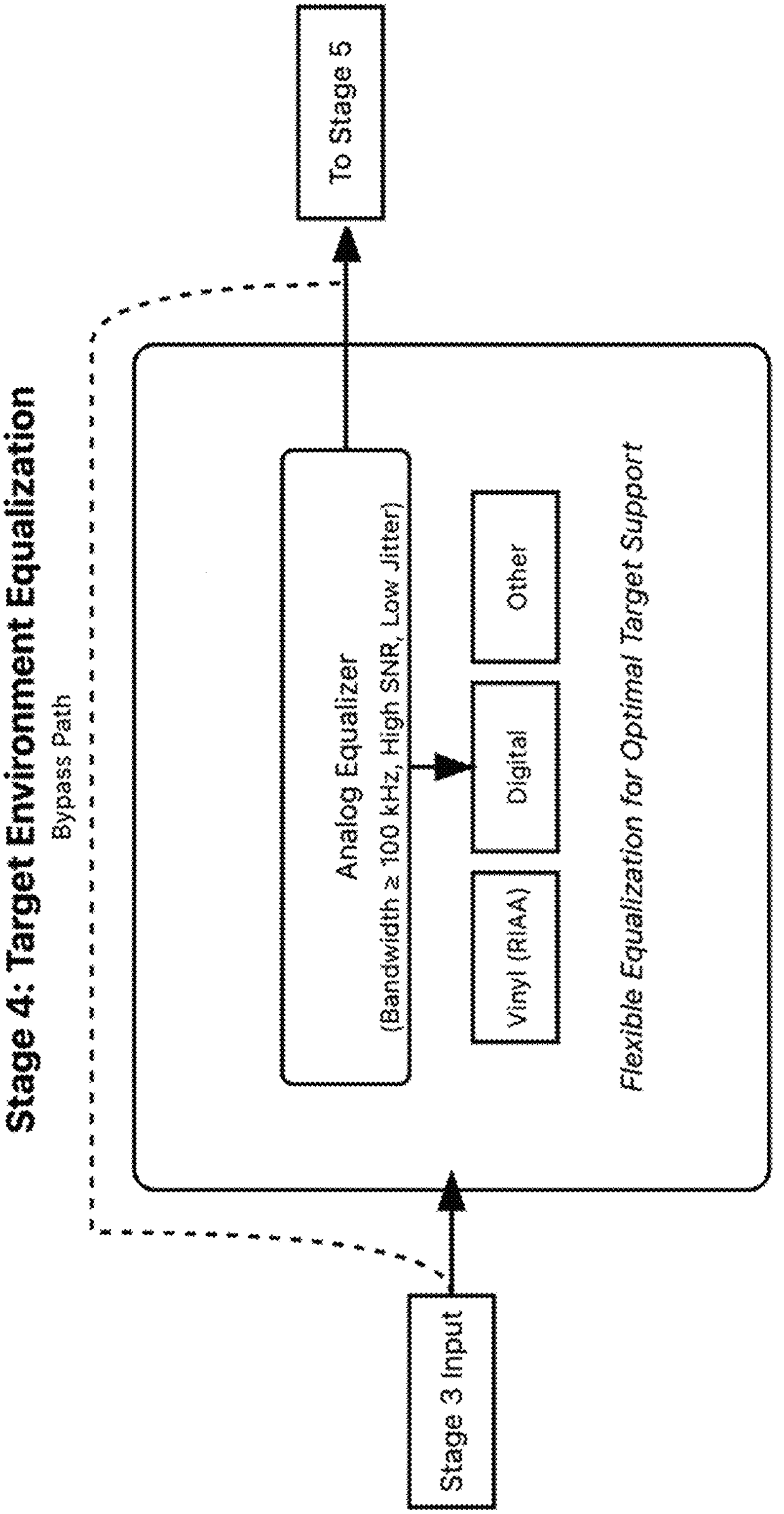
FIG. 20 is a schematic diagram of a target environment equalization stage of a pulse density modulation process according to one embodiment of the present invention.

As shown in FIG. 20, stage 4 uses either the same or a different equalizer, or another audio device that is able to serve the same purpose to enable analog audio equalization necessary for target playback medium and/or environment. In contrast to stage 2, stage 4 provides the optimal support for a particular target recording medium, purpose or environment. For example, if the final output of this stage 4 is to be optimal for mastering to vinyl, a Recording Industry Association (RIAA) or comparable curve is able to be implemented at this stage to allow for required results compatible with the usage requirements. For example, an RIAA curve is important to ensure that the resulting audio is able to be properly used for mastering and creating vinyl records.

Stage 4 supports the creation of one or more target environment compliant equalizations, the output of which then may continue to stage 5 for differential modulation and related transform as described. Stage 4 is able to be bypassed by having the output of stage 3 proceed directly to stage 5.

The purpose of stage 4 is to provide a flexible option to support the specific requirements most optimally, rather than leaving such optimization to others at some point in the future. Further, the fact that, as part of the system, Stage 4 supports 100 kHz or greater bandwidth, with a slew rate, SNR, and associated dynamic range at or above the perceptual and related limits of human hearing in the analog domain, allows the invention to mitigate any digital jitter, noise, and related factors that reduce the audible accuracy when compared to what a person would hear if at the original location of the audio event.

Figure 21:
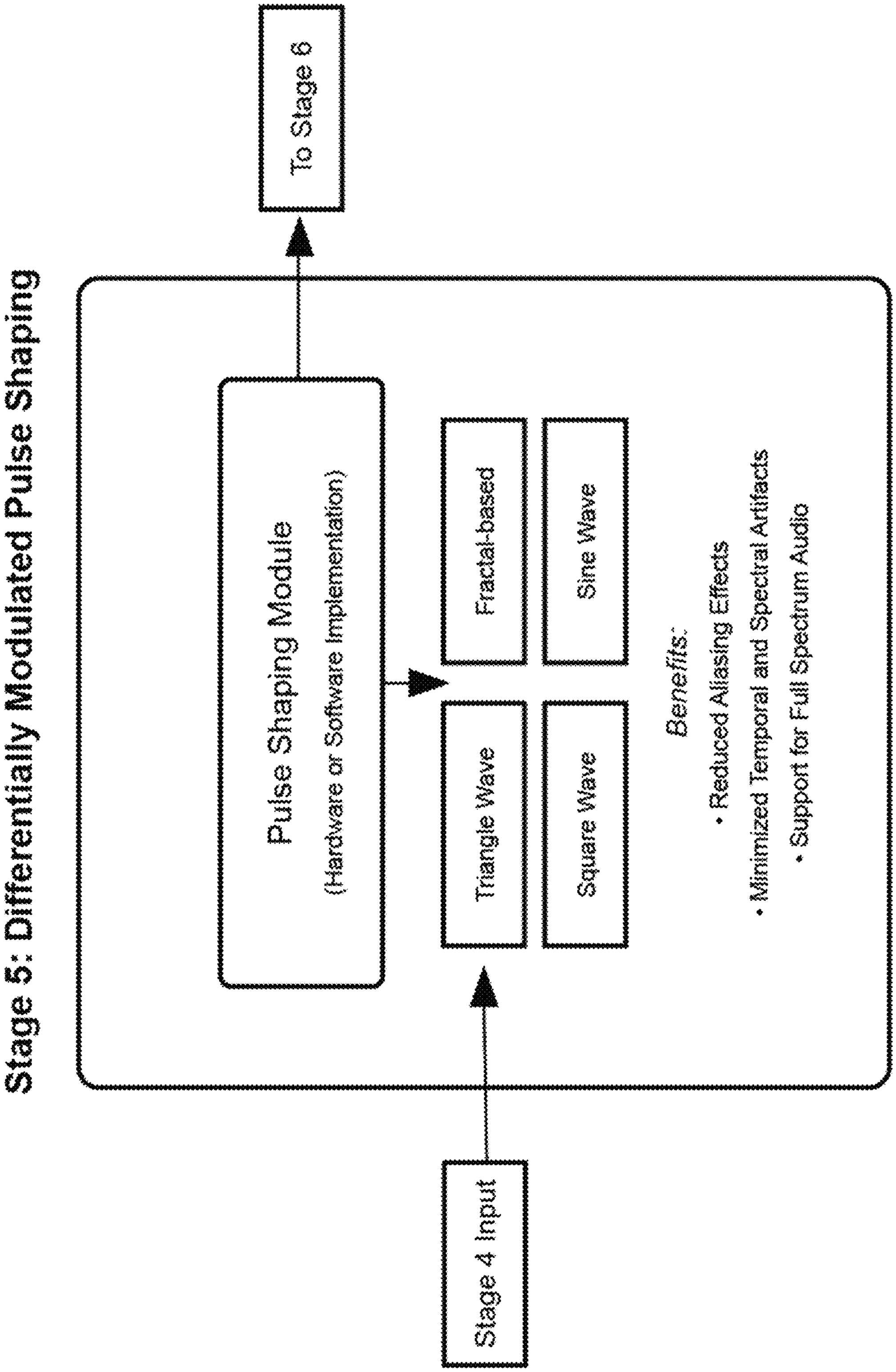
FIG. 21 is a schematic diagram of a differentially modulated pulse shaping stage of a pulse density modulation process according to one embodiment of the present invention.

As shown in FIG. 21, stage 5 employs differentially modulated pulse shaping using hardware or software that reduces aliasing effects throughout the subsequent band-limited stages and reducing temporal and spectral artifacts that otherwise are introduced in the analog-to-digital and related conversion processing. The pulse shaping is able to be based on any standard or purpose-specific nonlinear or linear-based implementation, including triangle, square wave, fractal, or sine wave based. As is commonly known by many in the field, each approach has its own benefits and related considerations in terms of optimal usage cases and constraints. As such, a unique aspect of the system is that it has an architecture and signal and processing flow to support any one or more of them, while obtaining maximal benefit of their use case due to the unique full spectrum and related perceptual human hearing factors driven capabilities.

Figure 15:
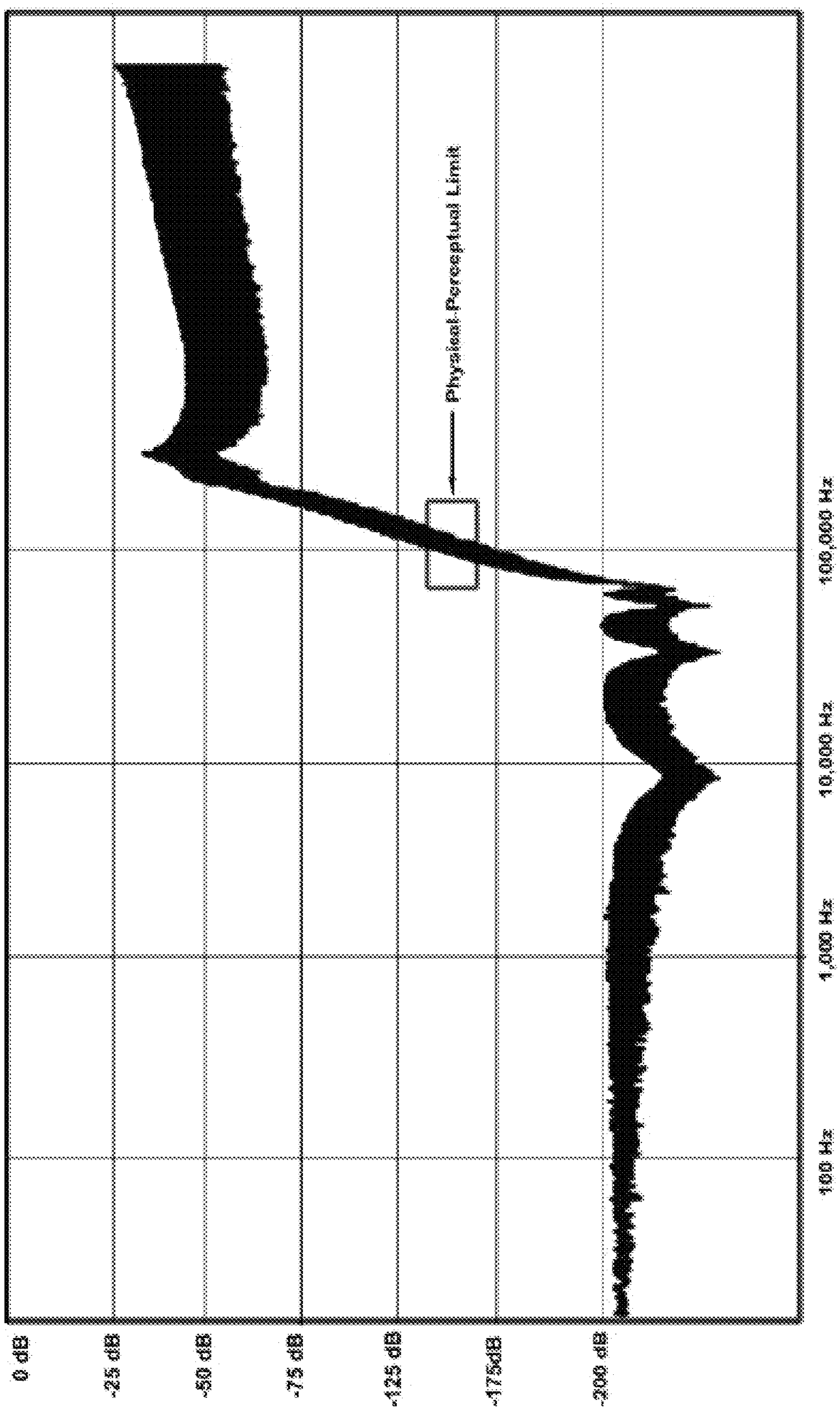
FIG. 15 is a graph showing limits for noise-constrained conversion.
Figure 22:
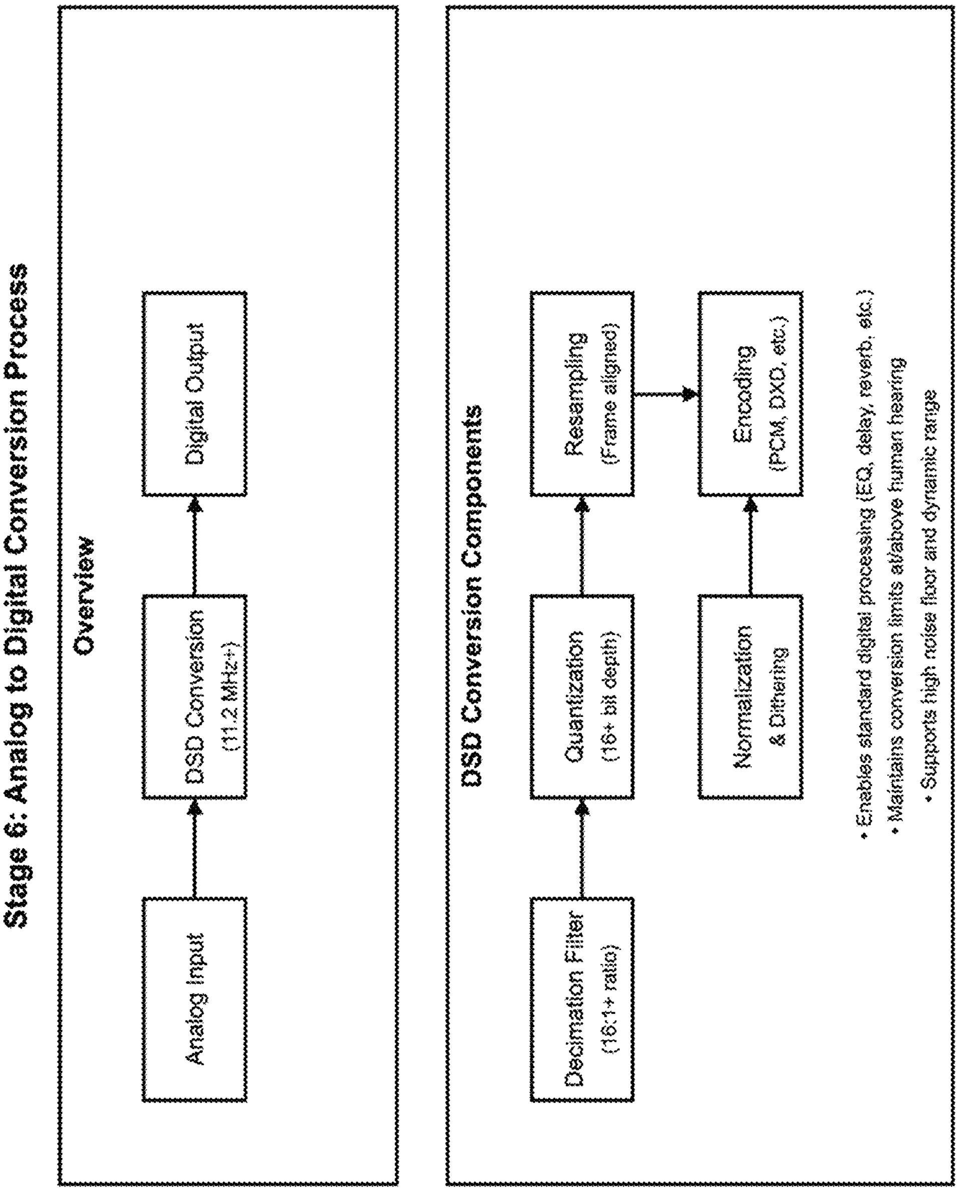
FIG. 22 is a schematic diagram of an analog-to-digital conversion stage of a pulse density modulation process according to one embodiment of the present invention.

As shown in FIG. 22, stage 6 is the analog to digital conversion process, which is able to employ, for example, the Direct Stream Digital (DSD) audio format-based encoding at an ideal, though not fixed, sampling rate of 11.2 MHz or above. The sampling rate is chosen in the analog to digital (A/D) conversion stage to maintain conversion limits at or above the physical and perceptual limits of human hearing as indicated in FIG. 15. While other existing standard or proprietary methods are able to be substituted for this in stage 6, such methods must be able to meet or exceed the noise, dynamics and other limits supported in stage 1-4 and optimized via stage 5. Standard Pulse Code Modulation (PCM)-based methods are not capable of supporting this level of audio performance and associated requirements, due to phase and aliasing anomalies and artifacts, anomalies and noise introduced via PCM functional requirements.

Stage 9 is an adaptive stage that serves to optimize for specific environments and usage. Stage 10 is designed to provide the highest available quality at the lowest possible bandwidth and file size as described herein. Stage 11 is a required stage for playback or storage of the unique audio in analog format. The last optional stage, stage 12, supports analog or digital storage in one or more of the four modes described herein.

The following are the core hardware and software components and requirements within the selected Direct Stream Digital (DSD) conversion: Decimation Filter: Sample rate conversion, optimally at a ratio of 16:1 or greater, such as from 11.2 MHz to a typical range of higher-end PCM bandwidths; Quantization: To a higher bit depth of at least 16:1, from 1-bit samples to 16 bit or higher PCM samples, to support an increase in the dynamic range and allow for complex digital routing and signal processing; Resampling: Frame boundary aligned sample rates, reducing any previously audible jitter, and enabling digital math to be executed as required with support of solid frame boundary alignment and tracking; Normalization & Dithering: Options such as TPDF or other dither are able to be used for lower quantized sample depth PCM rates of 16 bits or less; and Encoding: the data into a fully compliant PCM, Digital eXtreme Definition (DXD) or other digitally editable format, capable of standard digital processing, such as equalization, delay, reverb, compression, or other processing commonly, although not always, implemented via plugin, firmware, or other code.

Preferably, the DSD data that constitutes the ground truth data in one embodiment of the present invention is not processed by any high pass filter or low pass filter (with the possible exception of only a DC offset filter), such that no data is lost during the preprocessing of the data and the otherwise-filtered portions of the source audio are still able to be used to train the audio restoration and enhancement system as described herein.

Figure 23:
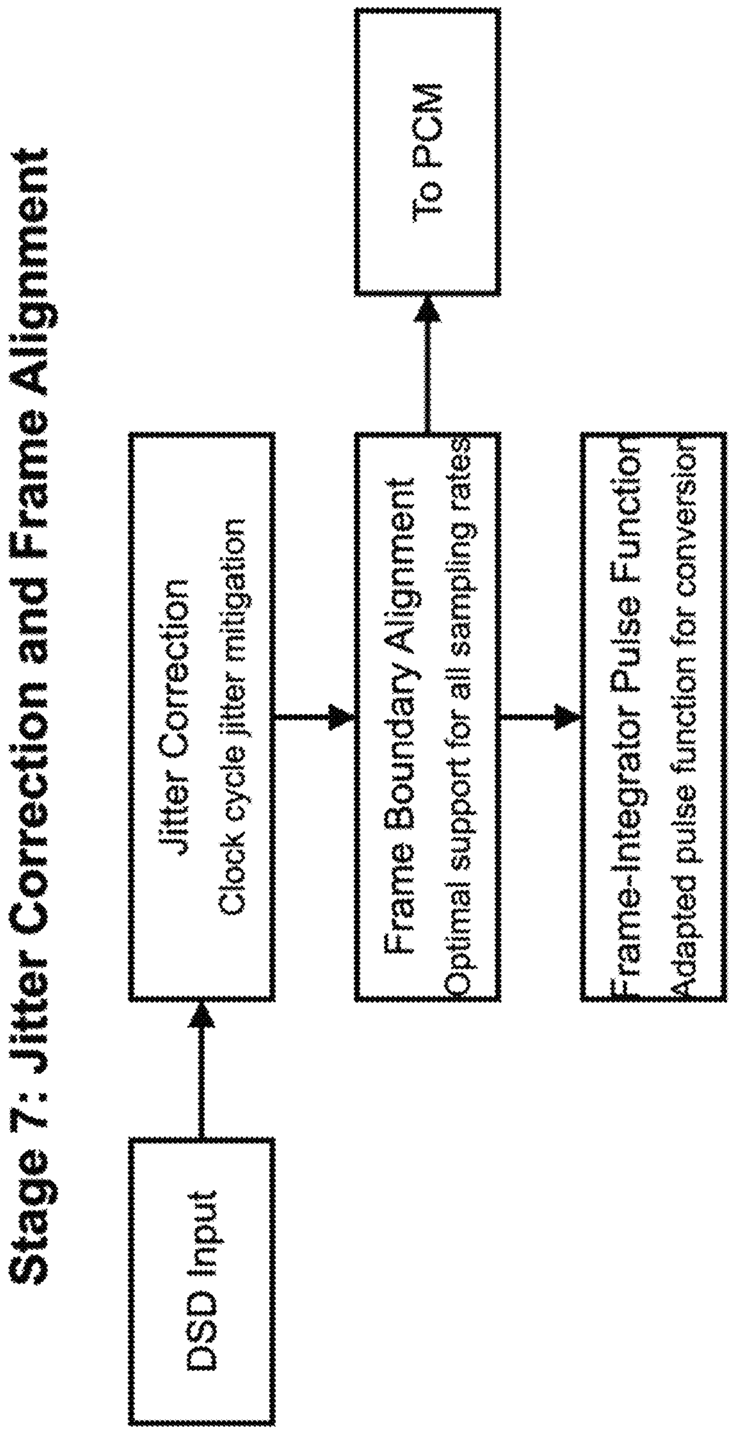
FIG. 23 is a schematic diagram of a jitter correction and frame alignment stage of a pulse density modulation process according to one embodiment of the present invention.

As shown in FIG. 23, stage 7 uses software or an embedded hardware or related approach to provide the jitter-corrected frame boundary and related alignment necessary to optimally support any possible data and associated sampling rate and related conversion to PCM as desired. A frame-integrator pulse function conversion using an adapted pulse function as described above supports a unique lossless PCM conversion in subsequent stages. This is necessitated because there is a difference between the natural integer multiples of PCM frequencies versus DSD, as well as to allow for clock cycle jitter that must be corrected for. This effectively mitigates the truncation or other irrecoverably discarded information that represents perceptually or otherwise audible detail (i.e., "lossy") decimation that are otherwise necessary and part of all current implementations.

Figure 24:
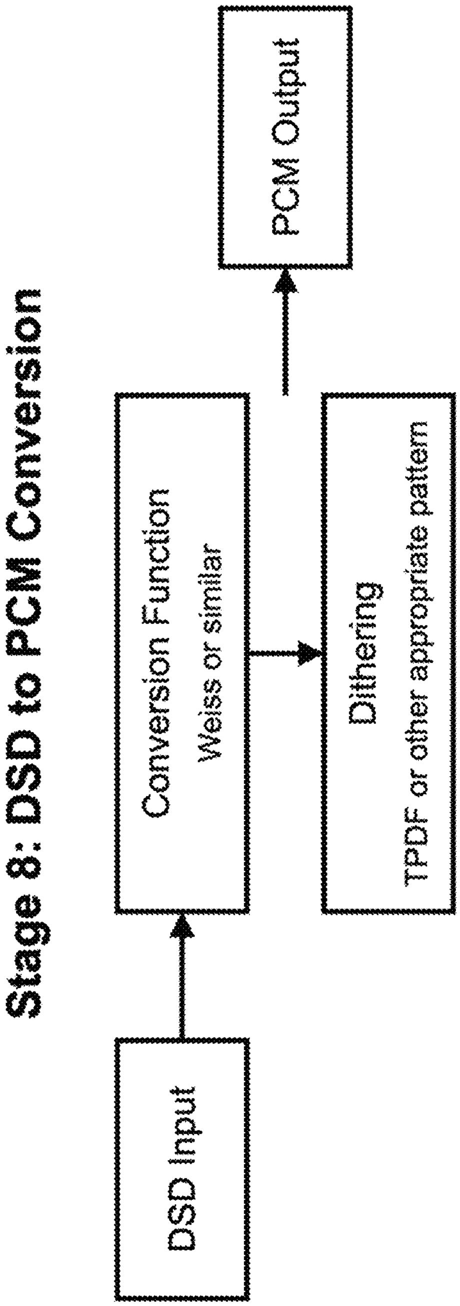
FIG. 24 is a schematic diagram of a DSD to PCM conversion stage of a pulse density modulation process according to one embodiment of the present invention.

As shown in FIG. 24, stage 8 defines the use of a Weiss or other DSD to PCM conversion function, with appropriate Triangular Probability Density Function (TPDF) or other dither pattern as most appropriate to the output and intended use as would generally be known by audio and music recording professionals. The purpose of this is to enable support for standards-based digital audio tools and methods, rather than having to introduce new, propriety or other non-standard approaches that potentially confound usage and adoption.

Figure 25:
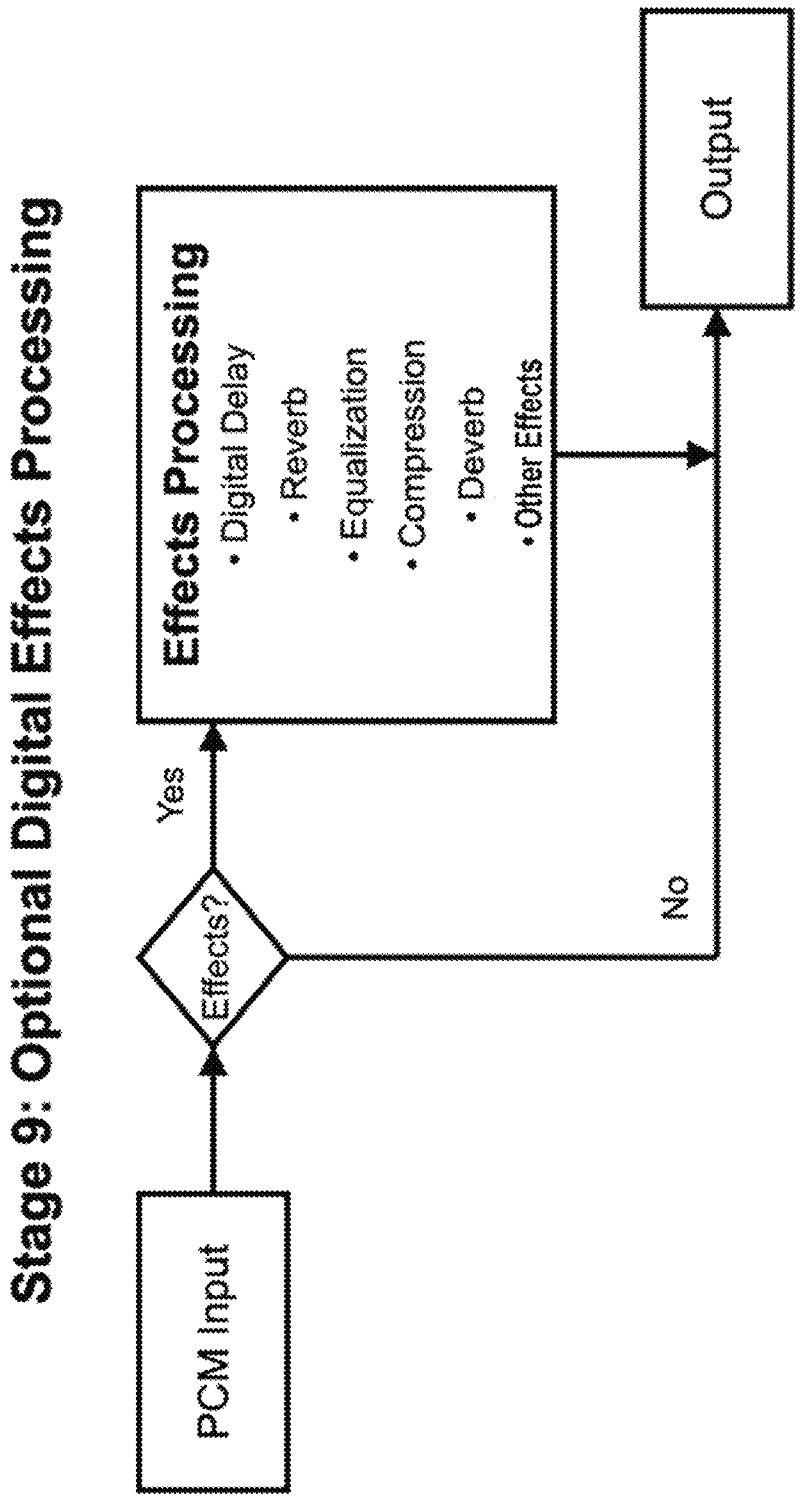
FIG. 25 is a schematic diagram of a digital effects processing stage of a pulse density modulation process according to one embodiment of the present invention.

As shown in FIG. 25, stage 9 is the first of four optional stages of the overall system shown in FIG. 16. Stage 9 uses software or its hardware-based equivalent for digital effects processing, such as digital delay, reverb, equalization, compression, deverb, or any other effects processing. The purpose of this is to provide for a user or other requirements of those using this type of system for typical music or related audio purposes.

Figure 26:
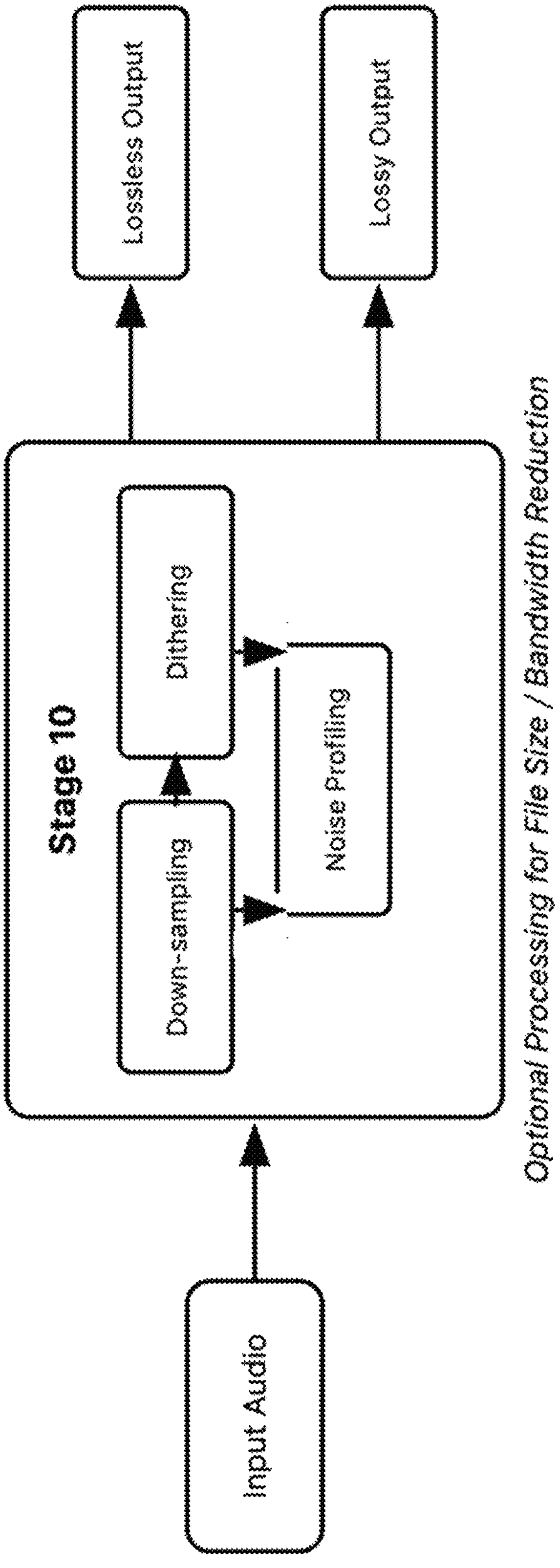
FIG. 26 is a schematic diagram of a file size and bandwidth reduction processing stage of a pulse density modulation process according to one embodiment of the present invention.

As shown in FIG. 26, stage 10 uses software or a hardware-based equivalent that provides optional support for down-sampling of any standard or other types of resampling often employed in music and other audio professions, along with any associated dithering or requisite noise profiling desired. This is useful to reduce the requisite file sizes and associated bandwidth, while minimizing any audible artifacts. While the core nature of this system supports true perceptually lossless audio, it also enables support for "lossy" (i.e., non-full spectrum and otherwise reduced audible detail based) implementation. However, even in lossy use cases, the perceptually and otherwise relevant characteristics provides distinct, audible enhancement and associated fidelity compared to other approaches, meaning there is more perceptually, and otherwise relevant audible information provided by the system, even after lossy or lossless compression, than any existing prior art system.

Figure 27:
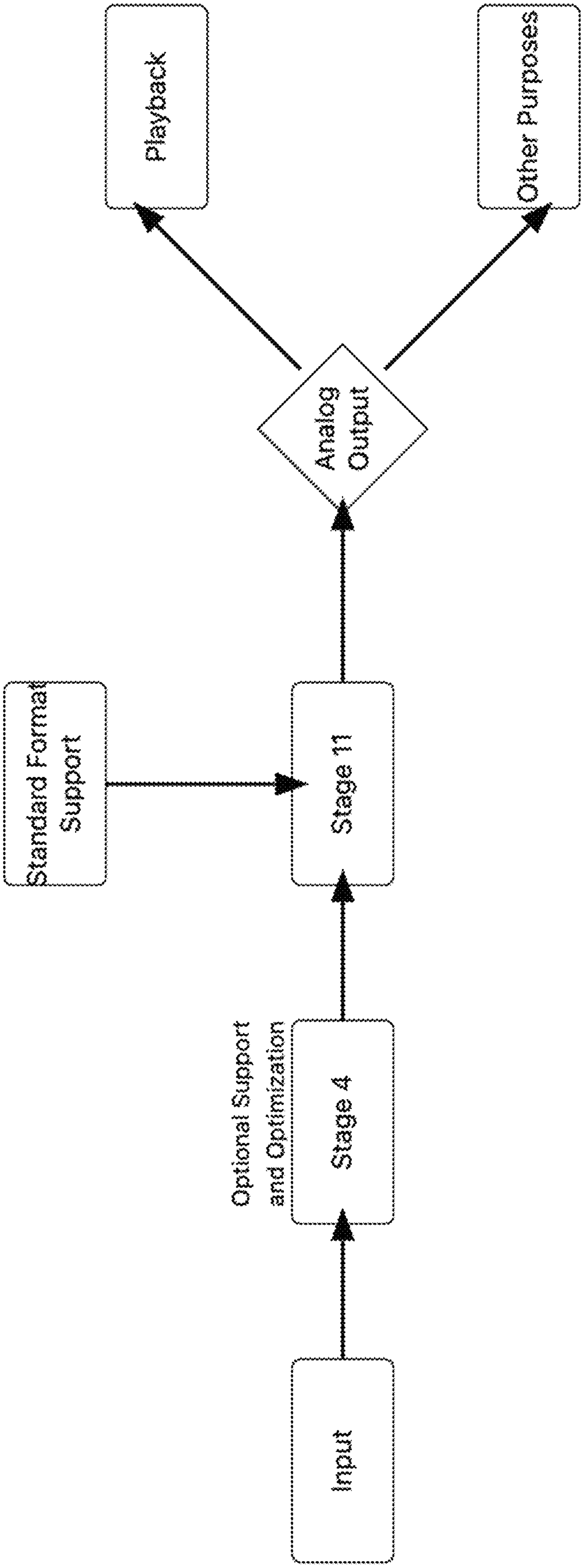
FIG. 27 is a schematic diagram of a digital-to-analog conversion stage of a pulse density modulation process according to one embodiment of the present invention.

As shown in FIG. 27, stage 11 provides optional support for analog output for playback or other purpose. Any standard format is supported, and support of stage 4 is able to be combined to facilitate and otherwise optimize for this stage.

Figure 28:
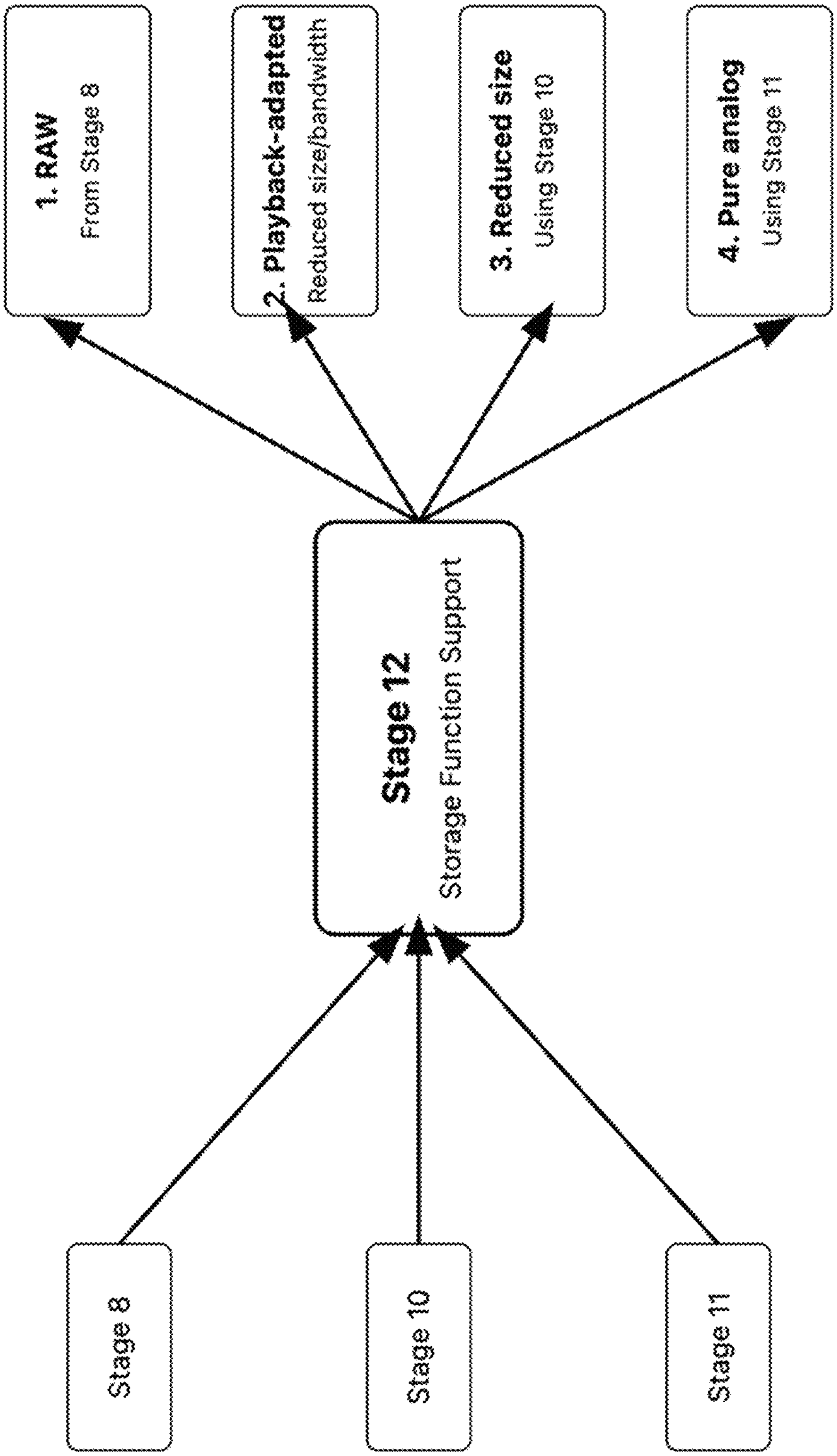
FIG. 28 is a schematic diagram of a storage function support stage of a pulse density modulation process according to one embodiment of the present invention.

As shown in FIG. 28, stage 12 provides storage function support for any of the following 4 types of storage: 1. Raw, directly from stage 8 with none of the processing of stages 9-11 employed; 2. Playback-adapted storage, employing reduced size and bandwidth requirements; 3. Reduced size storage, using stage 10 processing as defined herein; and 4. Pure analog storage, employing stage 11 analog output conversion.

As defined herein, the system employs an advanced hardware-enabled capture approach, together with uniquely integrated and configured audio capture hardware and software that drives the conversion sequence and supporting algorithms as described herein. Further, leveraging differential AI enabled analysis, the system integrates the results of Brain Computer Interface (BCI) or other comparably sourced data to optimize for actual perception and related results in those areas as noted. The result is a new and unique process to capture/record, represent, convert, and store sound to and from a digital or analog source or medium, which dramatically reduces size, bandwidth, and related overhead at any level of perceived audio quality. Analog components are selected and configured in a manner designed to avoid any need for low pass filtering and noise profiling within the boundaries of human hearing.

Together with the AI-assisted approach described herein, the system avoids all aliasing and phase skew back into the perceptual and physiological ranges of human hearing. The result of this is the first acoustically lossless inventive method to capture, store and transfer audible information for human hearing. The resulting capabilities go beyond simply improving sound to effectively match the limits of human hearing and perception. The audio output of the system is also able to be used to provide a reference audio standard for training AI via, among other things, providing a universal reference standard, or ground truth.

The audio processing techniques described herein are able to be used for a variety of purposes for improving the field of the art, including but not limited to those described below:

Fidelity Enhancement:

The AI-driven fidelity enhancement capabilities of the present invention represent a large improvement in audio quality enhancement not possible in prior art systems and methods owing to the use of the unique generative AI and training of the present invention. By leveraging advanced machine learning algorithms and training approaches, the system is able to analyze audio content across multiple dimensions (e.g., frequency spectrum, temporal characteristics, and spatial attributes) to identify and correct imperfections that detract from the original artistic intent as defined by actual ground truth perfection.

The system employs a unique neural network trained on vast custom datasets of ultra-high through low quality audio, allowing the system to recognize and rectify issues, such as frequency issues, phase anomalies, and various types of modulation, aliasing and other distortion types, resulting in a dramatically clearer, more detailed, and more engaging listening experience across all types of audio content.

For music and sound in a range of applications, the system therefore brings out the nuances of instruments and vocals that are generally masked in the original recording. For speech, it ensures every word is crisp and intelligible, even in challenging acoustic environments. The end result is audio that approaches the previously unobtainable ground truth (i.e., a perfect representation of the sound as it was intended to be heard).

Bandwidth Optimization:

The bandwidth optimization technology of the present invention represents a significant improvement for streaming services, and content delivery networks. By employing a unique set of AI training and optimization methods, the system is able to intelligently analyze and adapt audio content to make optimal use of available bandwidth without compromising on lossless files standards, or perceptually defined quality.

The system works by identifying all perceptually and audibly relevant information in the audio signal and prioritizing its optimization based on transmission and data rate constraints. The significant amount of noise, compression artifacts, and aliasing related masking elements that often account for 50% or more of the size of many recordings are eliminated. The actual information is intelligently compressed and recast into the desired standard format using the advanced AI models of the present invention, allowing for significant reductions in data usage-generally up to 50% or more—while maintaining, and in many cases improving, the perceived audio quality.

Unlike present compression means, the lossless audio produced by the present invention stays not only lossless but is also able to remain in the same standard lossless formats, with the same being true with lossy formats like MP3 and others. This avoids the need to distribute new types of players, encoder/decoders and other technologies, enabling immediate usability and global deployment. Moreover, the system is able to adapt in real-time to changing network conditions, ensuring a consistent, high-quality listening experience even in challenging connectivity scenarios. This not only enhances user satisfaction but also reduces infrastructure costs for service providers.

Imaging Correction:

Imaging correction capabilities of the system of the present invention improves the spatial perception of audio, particularly for stereo and multi-channel content. Using advanced AI algorithms, the system is able to identify and correct issues in the stereo field or surround sound image, resulting in a more immersive and realistic audio experience.

The system analyzes the phase relationships between channels, corrects phase and intermodulation anomalies, and perfects the separation and placement of audio elements within the soundstage based on ground truth training and related definitions, resulting in a wider, deeper, and more precisely defined spatial image and associated sound stage, bringing new life to everything from classic stereo recordings to modern surround sound mixes. Unlike prior approaches, this works with both traditional speakers as well as headphones and in-ear monitors.

For stereo content, this means a more expansive and engaging soundstage, with instruments and vocals precisely placed and clearly separated. In surround sound applications, it ensures that each channel contributes accurately to the overall immersive experience, enhancing the sense of being "there" in the acoustic space.

Noise Reduction:

The AI-powered noise reduction capabilities of the present invention provide a notable improvement in audio cleanup and restoration. Unlike traditional noise reduction methods that often introduce artifacts or affect the quality of the desired signal, the system of the present invention uses advanced machine learning to intelligently separate noise from the primary audio content.

The AI model is trained on a vast array of noise types—from compression and digital encoding artifacts and background hum, to intermittent types of spurious noise, allowing the system to identify and remove these unwanted elements with unprecedented accuracy. Additionally, the system is able to adapt to novel noise profiles in real-time, making it effective even in unpredictable acoustic environments.

The result is clean, clear audio that preserves all the details and dynamics of the original signal. This technology is particularly valuable in applications ranging from audio restoration of historical recordings to real-time noise cancellation in telecommunication systems and hearing aids.

Dynamic Range Optimization:

The dynamic range optimization capabilities of the present invention represent a paradigm shift in audio dynamics. Using sophisticated AI algorithms, the system analyzes the dynamic structure of audio content and intelligently adjusts it to suit different playback scenarios and devices based on a range of ground truth examples beyond current recording methods and approach, all while preserving the original artistic intent.

The system goes beyond simple compression or expansion by understanding the contextual importance of dynamic changes, preserving impactful transients and dramatic silences where such elements are crucial to the content, while subtly adjusting less critical variations to ensure clarity across different listening environments.

This intelligent approach ensures that audio remains impactful on high-end audio systems, while still being fully enjoyable on mobile devices or in noisy environments, which is particularly valuable for broadcast applications, streaming services, and in-car audio systems, where maintaining audio quality across a wide range of listening conditions is crucial.

Spectral Balance Correction:

The spectral balance correction capabilities of the system of the present invention utilize the AI to achieve ground truth-perfected tonal balance in any form of audio content. By analyzing the frequency content of audio in relation to vast databases of beyond master-quality references, the system identifies and corrects spectral imbalances that detract from the natural and pleasing quality of the sound.

The AI does not simply apply broad, one-size-fits-all equalization. Instead, the system understands the spectral relationships within the audio, preserving the unique character of instruments and voices while correcting problematic resonances, harshness, or dullness, resulting in audio that sounds natural and balanced across all playback systems. The system is therefore invaluable in mastering applications, broadcast environments, and consumer devices, ensuring that audio always sounds its best, regardless of the original production quality or the playback system.

Transient Enhancement:

The transient enhancement capabilities of the present invention provide a higher level of clarity and impact to audio content. Leveraging advanced AI algorithms, the system identifies and enhances transient audio events (i.e., split-second bursts of sound that characterize percussive elements like the attack of a drum hit or the pluck of a guitar string). Furthermore, by using an extensive amount of custom-created ground truth examples in training, the system is able to define and restore the sonic character based on frequency vs. phase over time and related partial harmonics relationships, resulting in a ground truth defined level of temporally accurate transient accuracy.

By intelligently optimizing these transients without negatively affecting the underlying sustained sounds by disregarding their temporal context, the system is able to dramatically improve the perceived clarity and definition of the audio. This process does not only make the input audio louder, but also helps to reveal the subtle details that make the audio sound physically present.

The system is particularly effective in music production, live sound reinforcement, and audio post-production for film and TV, as it is able to provide additional character to flat or dull recordings, enhance the impact of sound effects, and ensure that every nuance of a performance is clearly audible.

Mono to Stereo Conversion:

The mono to stereo conversion capabilities of the system of the present invention provide an improvement beyond traditional up-mixing techniques, which is impossible prior to the AI-enabled system and technique of the present invention. Using advanced AI models trained on vast libraries of ground truth defined stereo content and other related custom audio data, the system is able to transform mono recordings into real, spatially accurate stereo soundscapes.

The system analyzes the spectral and temporal characteristics of the mono signal to intelligently reconstruct audio elements across the dimensional stereo field. This process does not add artificial reverb or delay, rather creating a ground truth-defined, real-sounding stereo imaging that respects the original character of the audio while restoring innate width, depth, and immersion that was collapsed in mono source material. The system therefore has particular use in remastering historical recordings, enhancing mono content for modern stereo playback systems, and improving the listener experience for any mono source material, with the results often rivalling true stereo recordings in their spatial quality and realism.

Stereo to Surround Sound Up-Mixing:

The stereo to surround sound up-mixing capabilities of the present invention take two-channel audio to new dimensional levels or realism and presence. Powered by advanced AI algorithms, the system analyzes stereo content and intelligently distributes it across multiple channels to create a uniquely accurate immersive surround sound experience.

Unlike traditional up-mixing methods that typically result in artificial, phase-incoherent surround fields, the AI-enabled system understands the spatial cues inherent in the stereo mix. The system is able to identify individual elements within the mix and localize and distribute them naturally in the surround field based on ground truth training examples, creating a sense of envelopment that respects the original stereo image, and expanding it into three-dimensional space.

The system has particular use for home theater systems, broadcasting, and remastering applications, allowing vast libraries of stereo content to be experienced in rich, immersive surround sound, dramatically enhancing the listening experience without requiring access to original multi-track recordings.

Legacy Format to Immersive Audio Conversion:

The legacy format to immersive audio conversion capability of the system of the present invention bridges the gap between traditional audio formats and cutting-edge immersive audio experiences. Using state-of-the-art AI training and physics informed and optimized approaches, the system transforms content from any legacy format (e.g., mono, stereo, or traditional surround) into fully immersive audio experiences compatible with formats such as DOLBY ATMOS, SONY 360 REALITY AUDIO, as well as other current and future standards.

The AI does not only distribute audio to more channels, but rather understands the spatial relationships within the original audio and extrapolates them to create a ground truth accurate, phase and frequency-coherent three-dimensional soundscape. Individual elements within the mix are able to be identified and placed as discrete objects in 3D space, allowing for a level of immersion previously impossible with legacy content.

The system provides for additional opportunities for content owners, allowing entire back catalogs to be remastered for immersive audio playback using fully AI-automated generative transforms trained on custom-created ground truth libraries. This also provides a benefit in broadcast and streaming applications, enabling the delivery of immersive audio experiences even when only legacy format masters are available.

Adaptive Format Transcoding:

The adaptive format transcoding capability of the system represents the cutting edge of audio format conversion. Powered by sophisticated AI algorithms and unique ground truth reference constraints, the system dynamically converts audio between various formats and standards, optimizing the output based on the target playback system and environmental conditions.

The AI-based system does not merely perform a straight conversion, but also understands the strengths and limitations of each format and adapts the audio and associated requirements accordingly. For instance, when converting from a high-channel-count format to one with fewer channels, the system intelligently down-mixes in a way that preserves spatial cues and maintains the overall balance of the mix, considering phase vs frequency and the interplay of the format with those and related constraints.

Moreover, the system is able to be set to adapt in real-time to changing playback conditions. In a smart home environment, for example, the system is able to seamlessly adjust the audio format as a listener moves between rooms with different speaker setups. This ensures the best possible listening experience across all devices and environments.

Dialogue Intelligibility Enhancement:

The dialogue intelligibility enhancement capability of the system addresses one of the most common complaints in modern audio content, namely unclear or hard-to-hear dialogue. Using advanced AI models trained on vast datasets of clear speech, the system is able to identify and enhance dialogue within complex audio mixes without affecting other elements of the soundtrack.

The system goes beyond simple frequency boosting or compression and understands the characteristics of human speech and perceptual hearing factors and limitations, and separates it from background music, sound effects, and ambient noise. The system then enhances the clarity and prominence of the dialogue in a way that sounds natural and preserves the overall balance of the mix.

The system provides a benefit in broadcast, streaming, and home theater applications. It ensures that dialogue is always clear and intelligible, regardless of the viewing environment or playback system, dramatically enhancing the viewer experience for all types of content.

Audio Restoration:

The audio restoration capabilities of the system of the present invention represent an improvement in the ability to recover and enhance degraded audio recordings. Leveraging powerful AI algorithms, ground truth data, and associated training methods, the system is able to analyze damaged or low-quality audio and reconstruct it to a level of quality that often surpasses the original recording, while maintaining frequency vs phase, format-specific and other key constraints while doing so. Without this unique set of AI capabilities that govern the process, a significant amount of articulation and realism previously had to be sacrificed.

Similarly, the ground truth reference sources that are trained on enable a level of perfect standards reference that did not exist before, and therefore were not able to be applied as restoration and optimization constraints to any process.

The system is trained on a vast array of audio imperfections—from the wow and flutter of old tape recordings to a range of digital artifacts in CDs and other digital audio formats. This is able to identify hundreds of primary, secondary, and other issues, and not only remove them but also reconstruct the sample level and temporally defined audio that should have been there, thereby going far beyond traditional noise reduction or editing techniques.

The system is therefore particularly valuable for archivists, music labels, and anyone dealing with historical audio content and is able to breathe new life into recordings that were previously considered beyond repair, preserving audio heritage for future generations.

Personalized Audio Optimization:

The personalized audio optimization capabilities of the system of the present invention bring a new level of customization to the listening experience. Using generative and related machine learning approaches, coupled with unique ground truth training and reference data sets defined within the requirements of human hearing and perception using a broad frequency range, the system is able to analyze a listener's preferences, hearing capabilities, and even current environment to dynamically adjust audio content for optimal delivery.

The system is able to produce a personalized hearing profile for each user, understanding their frequency, phase and related sensitivities and limitations, dynamic range profile and preferences, and includes subjective tastes in aspects such as frequency accentuation/amelioration, timbral characteristics, and imaging vs soundstage characteristics. It is then able to apply these constraints to any audio content in real-time, ensuring that everything sounds its best for that specific listener.

Moreover, the AI is able to adapt to changing conditions. If the listener moves from a quiet room to a noisy environment, or a room with a different damping profile for instance, the system automatically adjusts to maintain intelligibility and enjoyment based on the listening device and criteria. The system has applications ranging from personal audio devices to car sound systems and home theaters, ensuring the first ground truth defined listening across virtually any situation.

Acoustic Environment Compensation:

The acoustic environment compensation capability of the system of the present invention brings studio-quality sound to any listening environment. Using advanced AI algorithms and custom ground truth defined training and reference/constraint data, the system analyzes the acoustic characteristics of a space in the context of a massive set of interrelated constraints that were impossible to consider prior to these AI enabled methods, and apply real-time corrections to the audio signal, effectively neutralizing the negative impacts of the room.

The system goes beyond traditional room correction systems by, first, not just adjusting frequency response, but also understanding complex room interactions, early reflections, and resonances, partial harmonics vs. listener perception interactions and preferences, and applying corrections that make the room "disappear" acoustically as much as desired. The result is a listening experience that is as close to the original studio mix as possible, or even leverages ground truth references to go beyond that level of perfected sound, regardless of the actual physical space. Further, most systems employ frequency equalization as a primary goal. In contrast, the present system addresses inter-related factors such as frequency vs. phase, and perception vs. playback device nonlinearities, while ensuring intonation, partial harmonics and other key elements are maintained or recovered based on ground truth.

The system has applications ranging from home audio and home theaters to professional studio environments and ensures consistent, high-quality audio playback across different rooms and spaces, which is particularly valuable for professionals who need to work in various environments.

Future Format Adaptation:

The future format adaptation capabilities of the system of the present invention allow for future-proofing audio content and systems. Using highly flexible AI models, the system is able to learn and adapt to new audio formats and standards as they emerge, ensuring that today's content and hardware investments remain viable well into the future.

As new audio formats are developed, the system is able to be quickly trained to understand and work with these formats without requiring a complete overhaul, meaning that content created or processed with the system today is easily able to be adapted for the playback systems of tomorrow. Because the heavy lifting is done prior to playback, the approach enables existing and future playback hardware and related devices to continue to function. No special playback hardware, software or related decoding elements are required. However, rather than being locked-into a given hardware set, playback chain, or formats/standards, this approach is able to address the strengths, capabilities and weaknesses of new formats and related options using the same AI architecture.

For content creators and distributors, this means their archives remain perpetually relevant. For hardware manufacturers, it offers the potential for devices that are able to be updated to support new formats long after purchase.

Figure 29:
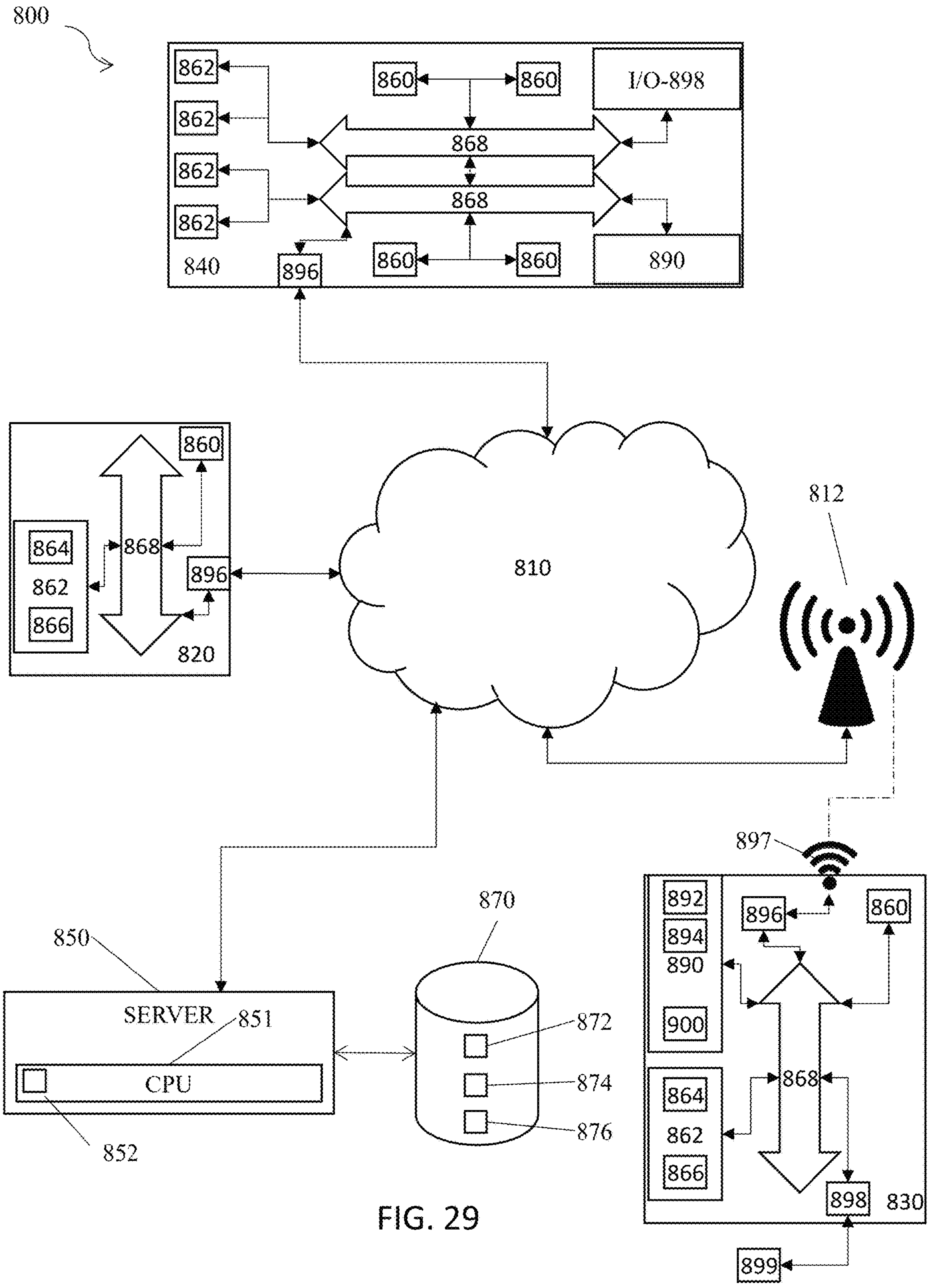
FIG. 29 is a schematic diagram of a system of the present invention.

FIG. 29 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, gaming controllers, joy sticks, touch pads, signal generation devices (e.g., speakers), augmented reality/virtual reality (AR/VR) devices (e.g., AR/VR headsets), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 29, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable to be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 29, is operable to include other components that are not explicitly shown in FIG. 29, or is operable to utilize an architecture completely different than that shown in FIG. 29. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A method for compressing audio content, comprising:

receiving an input audio file or stream in a digital or analog audio format;

performing artificial intelligence (AI)-based classification of the audio content, wherein the AI-based classification includes musical genre;

selectively upsampling the audio content using a deep learning enabled temporal Generative Adversarial Network (GAN) approach;

applying AI-assisted mapping of dynamics and harmonics;

converting the upsampled audio content into a spectral image;

applying AI-based noise identification and reduction methods;

applying an Inverse Short-Time Fourier Transform (ISTFT)-based transcoding transform to transform the spectral image to create transformed audio;

applying deep learning-based audio compression using GAN-assisted attention transformer methods;

applying selective transforms to generate one or more intermediate digital transform encodings;

and converting the transformed content into one or more output formats.

2. The method of claim 1, wherein the AI-based classification includes prediction of one or more of: weather elements and human activities.

3. The method of claim 1, wherein the method supports both lossless and lossy compression of the audio content.

4. The method of claim 1, further comprising enhancing the audio content.

5. The method of claim 1, the audio content includes information at least 1 dB below the noise floor.

6. The method of claim 1, further comprising capturing audio signals across an extended frequency range including frequencies at least one octave below 20 Hz and at least one octave above 20,000 Hz using no in-band low pass or high pass filters for the input audio file or stream in the digital or analog audio format.

7. The method of claim 6, further comprising utilizing AI to analyze and define human perception-based audio requirements for the audio signals.

* * * * *